(12) United States Patent
Terada

(10) Patent No.: US 7,885,525 B2
(45) Date of Patent: Feb. 8, 2011

(54) LENS BARREL, DRIVING METHOD THEREOF, AND IMAGE PICKUP DEVICE

(75) Inventor: Shuichi Terada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 267 days.

(21) Appl. No.: 11/458,557

(22) Filed: Jul. 19, 2006

(65) Prior Publication Data

US 2007/0019948 A1 Jan. 25, 2007

(30) Foreign Application Priority Data

Jul. 19, 2005 (JP) .............................. 2005-208958

(51) Int. Cl.
*G03B 17/00* (2006.01)
(52) U.S. Cl. .......................... 396/79; 396/348; 396/378
(58) Field of Classification Search ................... 396/79, 396/176–178, 348, 349, 373; 348/333.06, 348/371, 373–376
See application file for complete search history.

(56) References Cited

U.S. PATENT DOCUMENTS

| | | | | |
|---|---|---|---|---|
| 4,945,372 | A * | 7/1990 | Higuchi et al. | 396/61 |
| 4,965,615 | A * | 10/1990 | Fujita et al. | 396/83 |
| 5,438,381 | A * | 8/1995 | Mogamiya et al. | 396/85 |
| 5,655,159 | A * | 8/1997 | Nakayama et al. | 396/84 |
| 5,708,886 | A * | 1/1998 | Hayashi | 396/379 |
| 6,185,375 | B1 * | 2/2001 | Mikami | 396/84 |
| 6,312,168 | B1 * | 11/2001 | Naruse et al. | 396/349 |
| 6,404,988 | B1 * | 6/2002 | Tanabe | 396/62 |
| 6,606,206 | B2 | 8/2003 | Takeshita et al. | |
| 6,837,628 | B2 * | 1/2005 | Shintani | 396/351 |
| 6,839,086 | B1 | 1/2005 | Katagiri | |
| 6,934,096 | B1 | 8/2005 | Takeshita et al. | |
| 6,947,667 | B2 * | 9/2005 | Nagae | 396/84 |
| 7,038,859 | B2 * | 5/2006 | Tsuzuki | 359/704 |
| 7,133,216 | B2 | 11/2006 | Takeshita et al. | |
| 7,302,175 | B2 * | 11/2007 | Tsuji | 396/542 |
| 7,356,251 | B2 * | 4/2008 | Yamazaki et al. | 396/79 |
| 2002/0044363 | A1 | 4/2002 | Takeshita et al. | |
| 2004/0228626 | A1 * | 11/2004 | Endo et al. | 396/349 |
| 2005/0243444 | A1 | 11/2005 | Takeshita et al. | |
| 2006/0056078 | A1 * | 3/2006 | Nomura et al. | 359/811 |

FOREIGN PATENT DOCUMENTS

| | | |
|---|---|---|
| JP | 5-34569 A | 2/1993 |
| JP | 8-122858 A | 5/1996 |

(Continued)

*Primary Examiner*—Christopher E Mahoney
*Assistant Examiner*—Linda B Smith
(74) *Attorney, Agent, or Firm*—Rossi, Kimms & McDowell LLP

(57) ABSTRACT

A lens barrel which is capable of increasing the total length of the lens barrel in a shooting state even in a case where the collapsed lens barrel length is short, with a simple construction. A shooting optical system is disposed movably in an optical axis direction. A lens barrel driving member moves the shooting optical system in the optical axis direction while rotating around the optical axis. A lens barrel driving member moving unit moves the lens barrel driving member in the optical axis direction in a transition region during which the lens barrel moves between a shooting state and a non-shooting state while the driving member rotating.

10 Claims, 31 Drawing Sheets

FOREIGN PATENT DOCUMENTS

| | | |
|---|---|---|
| JP | 08-211470 A | 8/1996 |
| JP | 9-105982 A | 4/1997 |
| JP | 09-265121 A | 10/1997 |
| JP | 11-160597 A | 6/1999 |
| JP | 2000-134526 A | 5/2000 |
| JP | 2001-33857 A | 2/2001 |
| JP | 2001324663 A | 11/2001 |
| JP | 2003-215663 A | 7/2003 |
| JP | 2000-231140 A | 8/2007 |

* cited by examiner

LENS BARREL, DRIVING METHOD THEREOF, AND IMAGE PICKUP DEVICE

BACKGROUND OF THE INVENTION

1. Field of the Invention

The present invention relates to a lens barrel where a photographic optical system is disposed movably in an optical axis direction, its driving method, and an image pickup device, such as a digital camera which is equipped with the above-mentioned lens barrel.

2. Description of the Related Art

Conventionally, in a camera equipped with a telescopic lens barrel, the lens barrel is made short in an optical axis direction by being collapsed so as to increase its portability at the time of not shooting, and at the time of shooting, conversely, the lens barrel is projected from a camera body to secure the total length of a shooting lens. In a lens barrel which performs such a telescopic operation, there is known a technology of driving a shooting lens in the lens barrel using a cylindrical lens barrel driving member (hereinafter, referred to as "the drive ring") which is rotated around a shooting optical axis by a driving force of a motor.

Then, out of the lens barrels using the drive ring, some lens barrels may drive members other than the shooting lens with the drive ring (see Japanese Laid-Open Patent Publication (Kokai) No. 08-122858).

The drive ring in Japanese Laid-Open Patent Publication (Kokai) No. 08-122858 is so constructed as to have, on its outer peripheral surface, a cam for driving a finder lens, and have a shooting lens thereinside. Then, the drive ring rotates around an optical axis of the shooting lens, and drives a finder lens while transferring its driving force to the shooting lens disposed thereinside.

In Japanese Laid-Open Patent Publication (Kokai) No. 09-105982, the drive ring has, at its outer peripheral surface, a convex portion for making a strobe retractable, and this drive ring rotates around an optical axis of a shooting lens, and drives the strobe while transferring its driving force to the shooting lens disposed thereinside.

However, in the above-mentioned conventional cameras, in order to satisfy user needs of using a lens with higher magnification than ever before, there has been desired a lens barrel which can further increase the total length of the lens barrel in a shooting state even in a case where the collapsed lens barrel length is short.

Although it is considered to use the above-mentioned drive ring in order to attain this technology with a simple construction, each of the drive rings used for the conventional lens barrels mentioned above merely functions as means for transferring its driving force to the lens barrel etc. in a telescopic operation, and hence, it is not so constructed that the drive ring itself moves in the optical axis direction. Therefore, the drive ring itself has not been used so as to further increase the total length of the lens barrel in the shooting state.

SUMMARY OF THE INVENTION

In view of the above-mentioned problems, it is, therefore, an object of the present invention to provide a lens barrel, a driving method thereof, and an image pickup device, which is capable of increasing the total length of a telescopic lens barrel in a shooting state even in a case where the collapsed lens barrel length is short, with a simple construction.

To attain the above-mentioned object, according to a first aspect of the present invention, there is provided a lens barrel comprising: a shooting optical system disposed movably in an optical axis direction; a lens barrel driving member which moves the shooting optical system in the optical axis direction while rotating around the optical axis; and a driving member moving unit which moves the lens barrel driving member in the optical axis direction in a transition region during which the lens barrel moves between a shooting state and a non-shooting state while the driving member rotating.

Preferably, the lens barrel driving member moving unit has a first cam groove portion that is formed on a surface of the lens barrel driving member and is comprised of a cam track for moving the lens barrel driving member in the optical axis direction, and a fitting member that is fixed to a supporting member supporting the lens barrel, and is fitted into the first cam groove portion.

Preferably, the lens barrel driving member has a second cam groove portion comprised of a cam track for driving a shooting-related member except the shooting optical system.

Preferably, the second cam groove portion is comprised of a cam track for driving an external finder lens.

Preferably, the second cam groove portion is comprised of a cam track for performing a retracting operation of an external strobe.

Preferably, the second cam groove portion is comprised of a cam track for performing an operation related to opening and closing of a barrier covering a light introducing portion of the lens barrel concerned.

Preferably, a transition region of the cam track in the first cam groove portion between the shooting state and the non-shooting state and a transition region of the cam track in the second cam groove portion between the shooting state and the non-shooting state are parallel to each other.

According to a second aspect of the present invention, there is provided an image pickup device, comprising the above-mentioned lens barrel, and performing a shooting operation using the lens barrel.

According to a third aspect of the present invention, there is provided a method of driving a lens barrel including a shooting optical system disposed movably in an optical axis direction, comprising the steps of: moving the shooting optical system in the optical axis direction while rotating around the optical axis; and moving the lens barrel driving member in the optical axis direction in a transition region during which the lens barrel moves between a shooting state and a non-shooting state while the lens barrel driving member rotating.

According to the present invention, it is possible to increase the total length of the lens barrel in a shooting state even in a case where the collapsed lens barrel length is short, with a simple construction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

Preferred embodiments of the present invention will be described in detail below with reference to the drawings.

<Construction of Camera>

Figure 1:
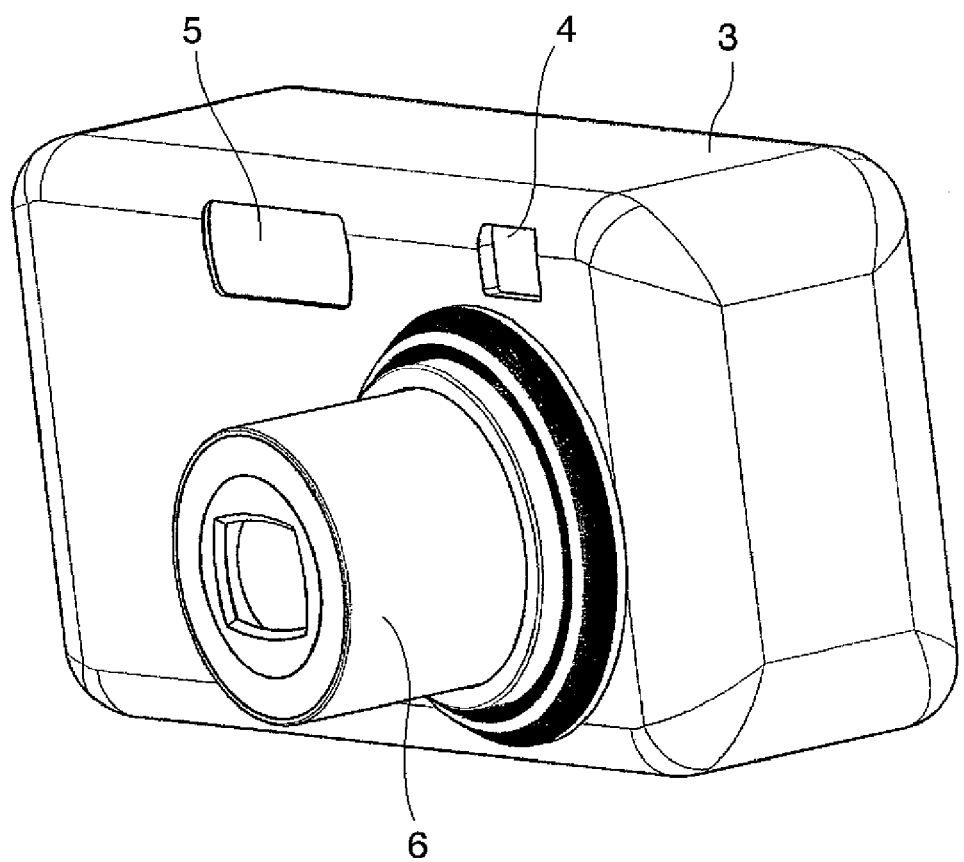
FIG. 1 is an external perspective view of a camera which has a lens barrel according to a first embodiment.
Figure 2:
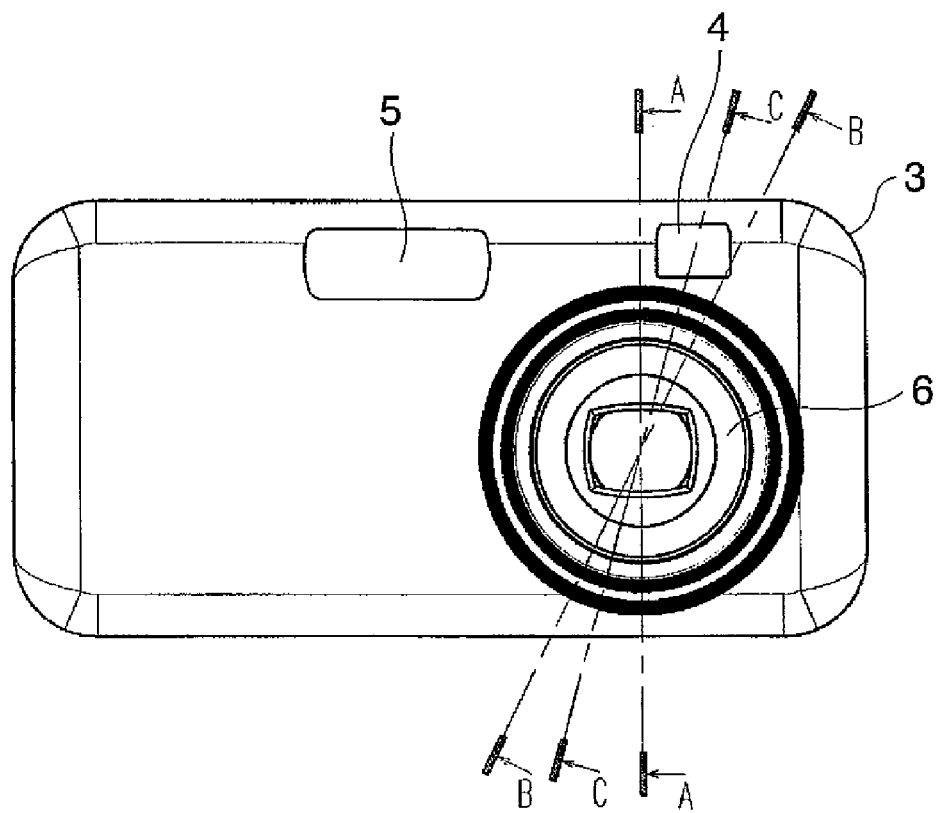
FIG. 2 is a front view of the camera shown in FIG. 1.

FIG. 1 is an external perspective view of a camera which has a lens barrel according to a first embodiment of the present invention, and FIG. 2 is a front view of the camera shown in FIG. 1.

This camera 1 is covered with an exterior member 3 having operation members and a liquid crystal display device, both of which are not shown. Furthermore, this camera 1 comprises a digital camera which is equipped with a hard board having not only a finder unit 4, a strobe 5, and a telescopic lens barrel 6, but also circuits comprised of electric elements and the like, a battery, a recording device for recording an object image, and the like, the latter of which are not shown.

<Construction of Lens Barrel and its Periphery>

Out of thus constructed digital camera, construction of the telescopic lens barrel 6 and its periphery will be described with reference to FIGS. 3 to 7.

Figure 3:
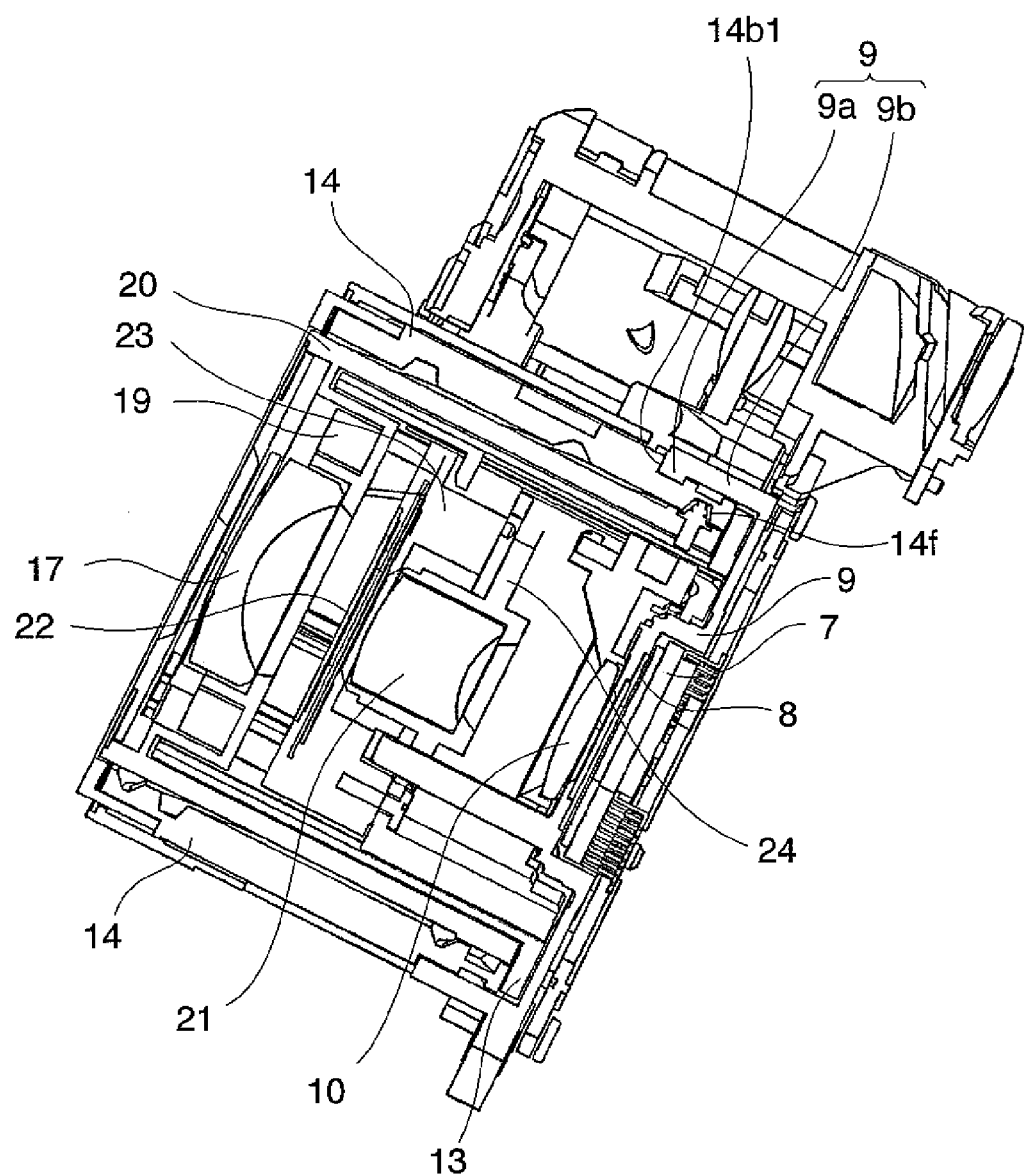
FIG. 3 is a sectional view, taken along the line B-B, of a lens barrel 6 when the lens barrel 6 is in a retracted (collapsed) state.
Figure 4:
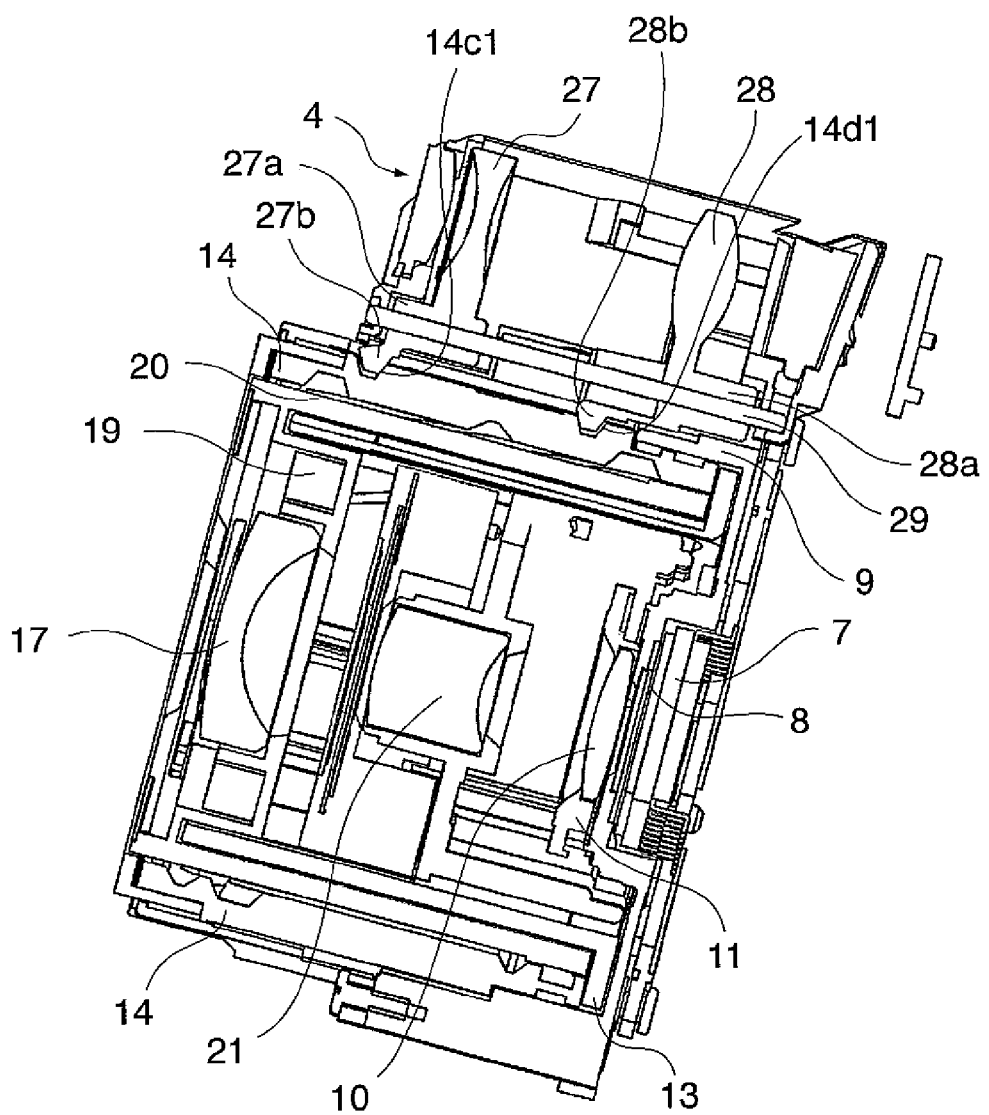
FIG. 4 is a sectional view, taken along the line C-C, of the lens barrel 6 when the lens barrel 6 in the retracted state.
Figure 5:
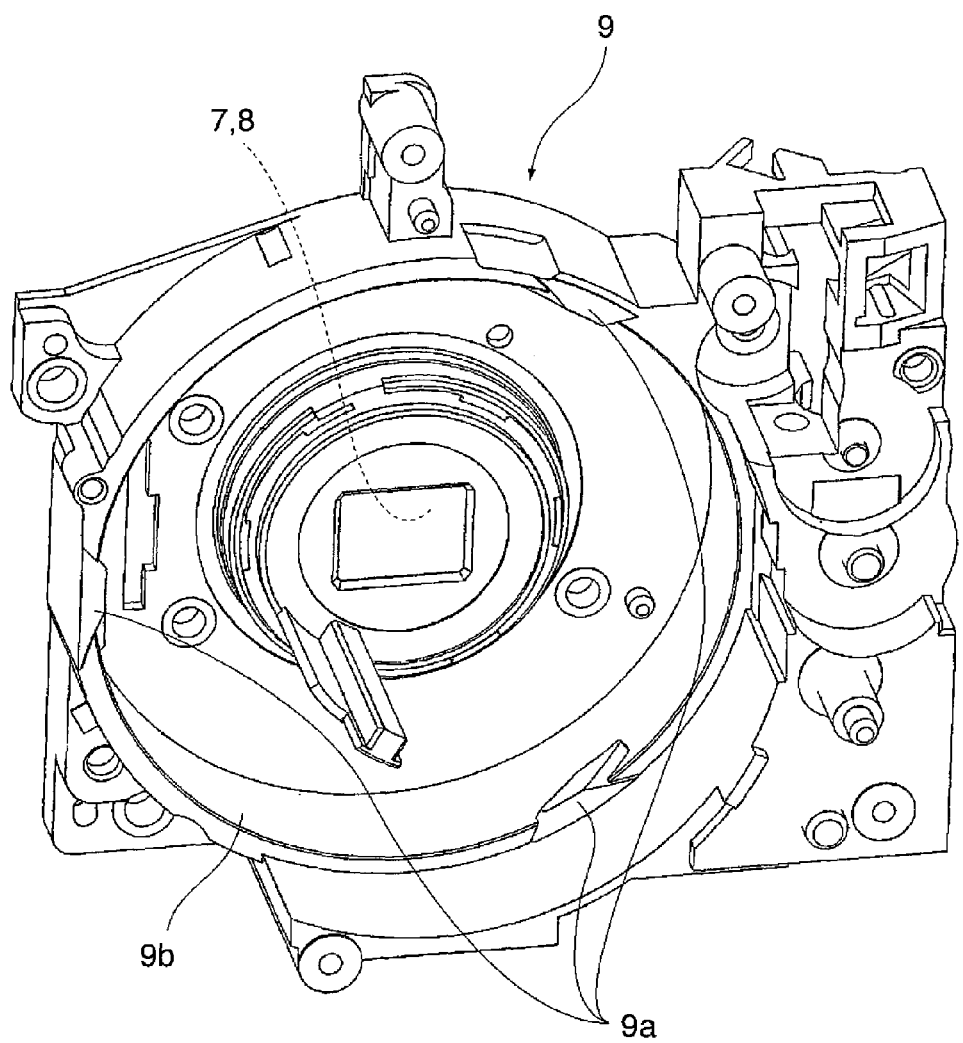
FIG. 5 is a perspective view of a CCD holder.

FIG. 3 is a sectional view, taken along the line B-B, of the lens barrel 6 when the lens barrel 6 is in a retracted (collapsed) state, and FIG. 4 is a sectional view, taken along the line C-C, of the lens barrel 6 when the lens barrel 6 is in the retracted state. In addition, FIG. 5 is a perspective view of a CCD holder 9.

As shown in FIGS. 3 and 4, the lens barrel 6 has a first group barrel 20 holding a first lens group 17, a second group holder 24 holding a second lens group 21, and a third group holder 11 holding a third lens group 10, which are sequentially arranged from a light introduction side. The third group holder 11 is mounted on the CCD holder 9 in a deepest portion of a camera body.

A cylindrical drive ring 14 characterizing this embodiment is disposed around the first group barrel 20 and the second group holder 24. Rotation of this drive ring 14 causes its driving force to be transferred to the first group barrel 20 and the second group holder 24.

The first group barrel 20 has, besides the first lens group 17, a lens barrier 18 and a barrier driving device 19 mounted thereon. The lens barrier 18 serves for a member for protecting the first lens group 17 when the lens barrel 6 is retracted, and is driven by the barrier driving device 19. In addition, on the second group holder 24 are mounted the second lens group 21, a shutter blade 22, and a shutter driving device 23 for driving the shutter blade 22.

Then, the CCD holder 9 supporting the lens barrel 6 has, fixed thereto, not only a CCD 7 as an image sensing element, a low-pass filter 8, and the third group holder 11 mounted thereon, but also a cylindrical fixed barrel 13 which supports the first group barrel 20 and the second group lens holder 24 linearly movably in an optical axis direction. That is, the first group barrel 20 and the second lens group holder 24 are restricted in movement in the optical axis direction by the fixed barrel 13 which is disposed therebetween. Furthermore, a publicly-known lens telescopic mechanism (not shown) which is comprised of a guide bar, a stepping motor, and a lead screw device is mounted on the CCD holder 9 to drive the third lens group 10 in the optical axis direction.

As shown in FIG. 5, three bayonet keys 9a are disposed at regular intervals on the cylindrical portion 9b of the CCD holder 9. The bayonet keys 9a, characterizing this embodiment, are fitted into bayonet grooves 14b of the drive ring 14, respectively, and hence are used for causing the drive ring 14 itself to advance or retreat in the optical axis direction, as described hereinbelow.

Figure 6:
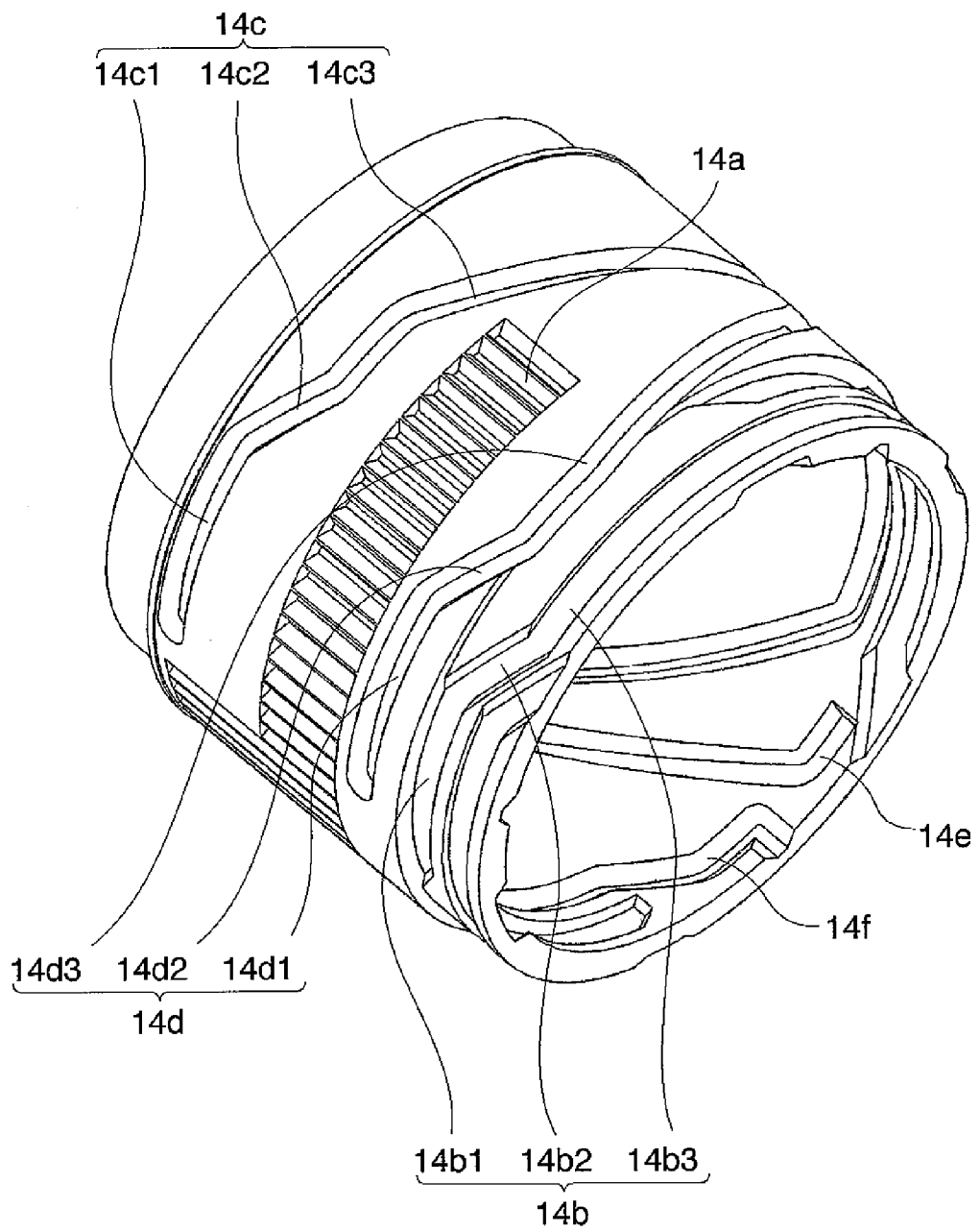
FIG. 6 is a perspective rear side view of a drive ring according to the first embodiment.
Figure 7:
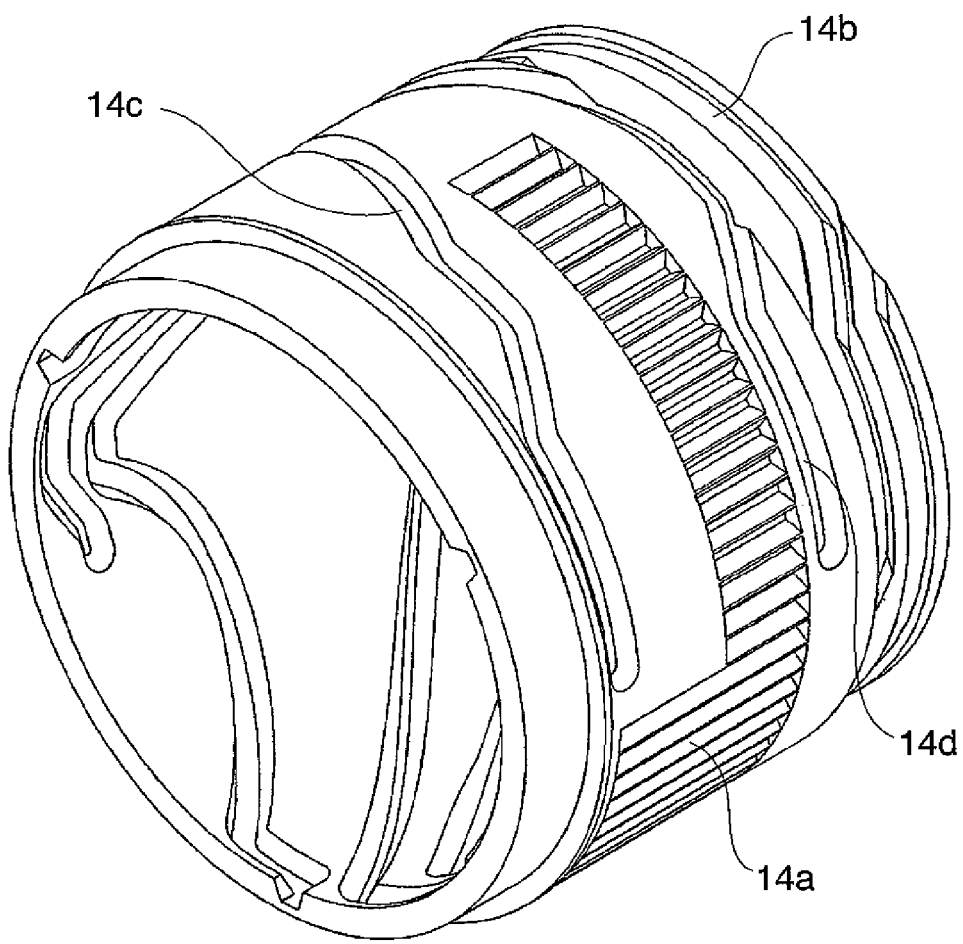
FIG. 7 is a perspective front side view of the drive ring.

FIG. 6 is a perspective rear side view of the drive ring 14 according to the first embodiment, and FIG. 7 is a perspective front side view of the drive ring 14.

As shown in FIGS. 6 and 7, the drive ring 14 has a gear portion 14a on its outer peripheral surface, and is driven by a publicly-known lens barrel driving device (not shown) comprised of a gear train, a zoom motor, etc. which are connected to this gear portion 14a. That is, the drive ring 14 is held by the cylindrical portion 9b of the CCD holder 9 so as to rotate around the optical axis. In addition, rotation driving of the zoom motor is controlled by a circuit on a hard board (not shown).

Furthermore, the drive ring 14 has three bayonet keyways 14b, formed on its outer peripheral surface, which are comprised of a collapsing region 14b1, a transition region 14b2, and a shooting region 14b3. In addition, the drive ring 14 has three first group cam grooves 14e and three second group cam grooves 14f are formed on its inner peripheral surface.

Here, the three first group cam grooves 14e of the drive ring 14 are fitted to three pin portions 20a of the first group barrel 20, respectively. In addition, the second group cam grooves 14f are fitted to two cam pins 24a and an urging pin 26 of the second lens group holder 24. The urging pin 26 is urged outwardly in a direction orthogonal to the optical axis by an urging spring 25 (refer to FIG. 8 described later).

Since three pin portions 20a are fitted into the first group cam grooves 14e of the drive ring 14 and then restricted linearly movably by the fixed barrel 13. Rotation of the drive ring 14 allows the first group barrel 20 to advance or retreat along the first group cam grooves 14e in the optical axis direction without rotating with respect to the camera body.

In addition, since the two cam pins 24a and the urging pin 26 are fitted into the second group cam grooves 14f of the drive ring 14 to thereby be restricted linearly movably by the fixed barrel 13. Rotation of the drive ring 14 allows the second group lens holder 24 to advance or retreat along the second group cam grooves 14f in the optical axis direction without rotating with respect to the camera body.

Furthermore, a bayonet key 9a of the CCD holder 9 is fitted into the bayonet keyway 14b of the drive ring 14. Hence, rotation of the drive ring 14 causes, a portion of the bayonet keyway 14b into which the bayonet key 9a is fitted to shift from the collapsing region 14b1 through the transition region 14b2 to the shooting region 14b3. Then, according to a step (lift) of the transition region 14b2 in the optical axis direction, the drive ring 14 itself moves in the optical axis direction.

On the other hand, the finder unit 4 disposed at an upper portion of the lens barrel 6 has an optical system which is independent of the lens barrel 6. This finder unit 4 is zoomed by advancing or retreating two finder lenses 27, 28 in the optical axis direction according to a zooming operation of the lens barrel 6.

On the outer peripheral surface of the drive ring 14 are formed a finder cam groove 14c for driving the finder lens 27 in the optical axis direction, and a finder cam groove 14d for driving the finder lens 28 in the optical axis direction, besides the three bayonet keyways 14b comprised of the collapsing region 14b1, the transition region 14b2, and the shooting region 14b3.

The finder cam groove 14c is comprised of a collapsing region 14c1, a transition region 14c2, and a shooting region 14c3, and the finder cam groove 14d is comprised of a collapsing region 14d1, a transition region 14d2, and a shooting region 14d3. Then, the transition region 14c2 of the finder cam groove 14c, and the transition region 14d2 of the finder cam groove 14d are approximately parallel in cam track to the transition region 14b2 of the bayonet keyway 14b.

As shown in FIG. 4, the finder lens 27 has a sleeve portion 27a and a cam pin 27b, and the finder lens 28 has a sleeve portion 28a and a cam pin 28b similarly. Since the finder lens 27 is supported linearly movably in the optical axis direction by a guide bar 29 fitted into the sleeve portion 27a and the cam pin 27b is fitted into the finder cam groove 14c, rotation of the drive ring 14 allows the finder lens 27 to move in the optical axis direction. Since the finer lens 28 is supported linearly movably in the optical axis direction by the guide bar 29 fitted into the sleeve portion 28a and the cam pin 28b is fitted into the finder cam groove 14d, rotation of the drive ring 14 allows the finder lens 28 to move in the optical axis direction.

In addition, the finder lenses 27, 28 are urged nearer to each other by a tension spring not shown lest the cam pin 27b should separate from the finder cam groove 14c, and lest the cam pin 28b should separate from the finder cam groove 14d.

A lens barrel telescopic operation of a digital camera using the zoom lens barrel 6 with the above-mentioned construction will be described with reference to FIGS. 8 to 12.

Figure 8:
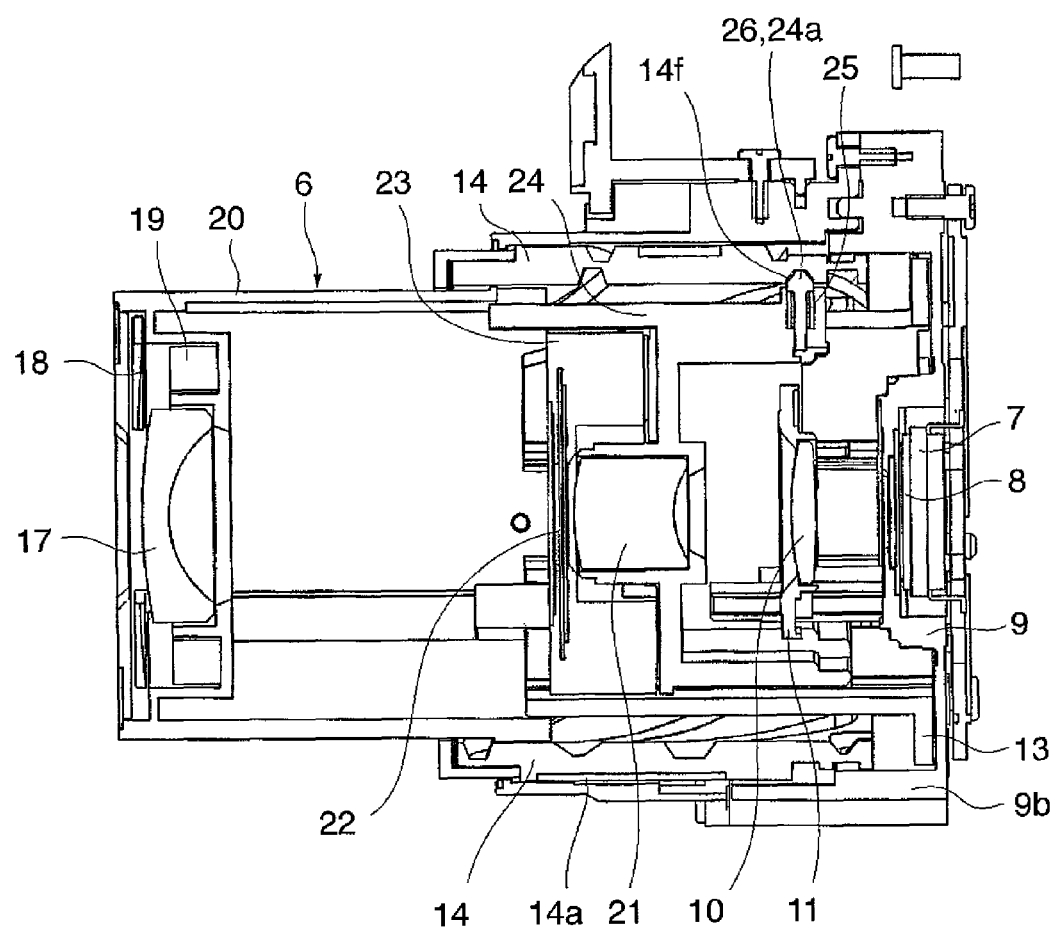
FIG. 8 is a sectional view, taken along the line A-A, of the lens barrel according to the first embodiment, which is in a wide-angle state.
Figure 9:
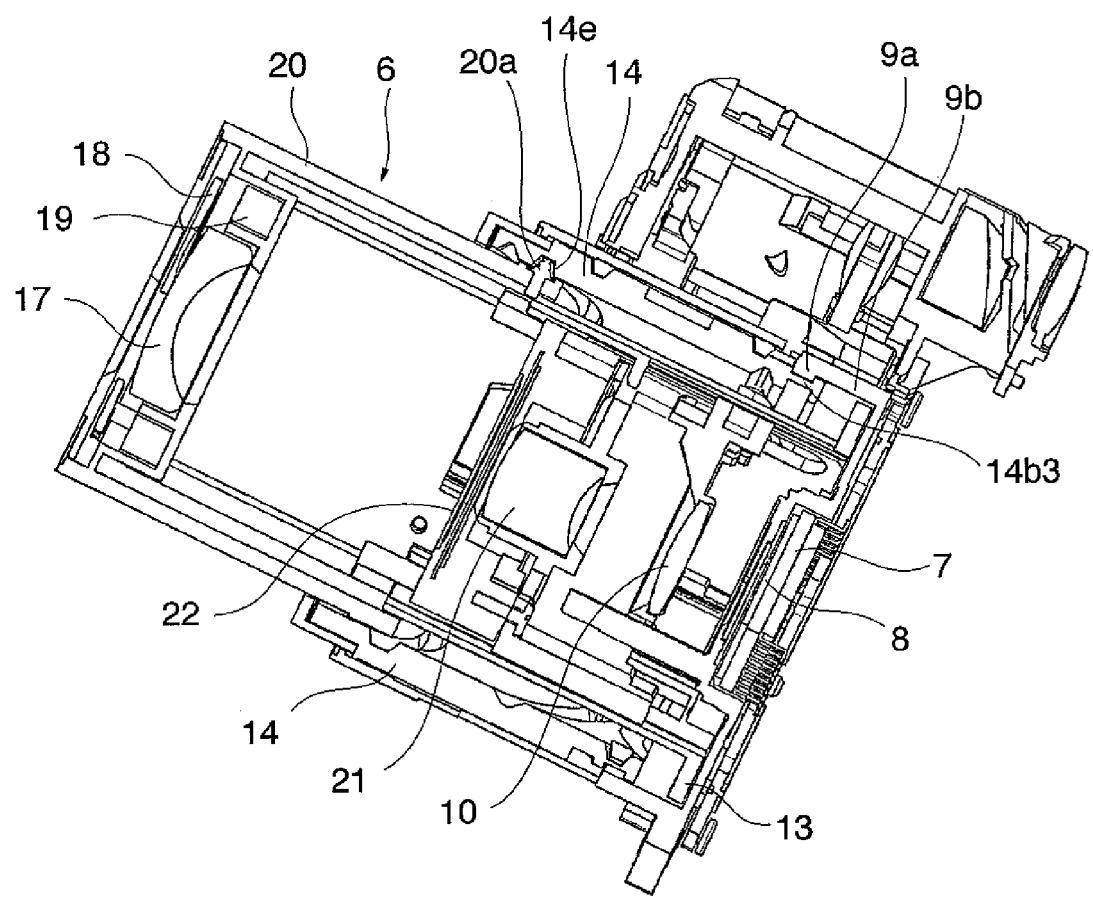
FIG. 9 is a sectional view, taken along the line B-B, of the lens barrel which is in the wide-angle state.
Figure 10:
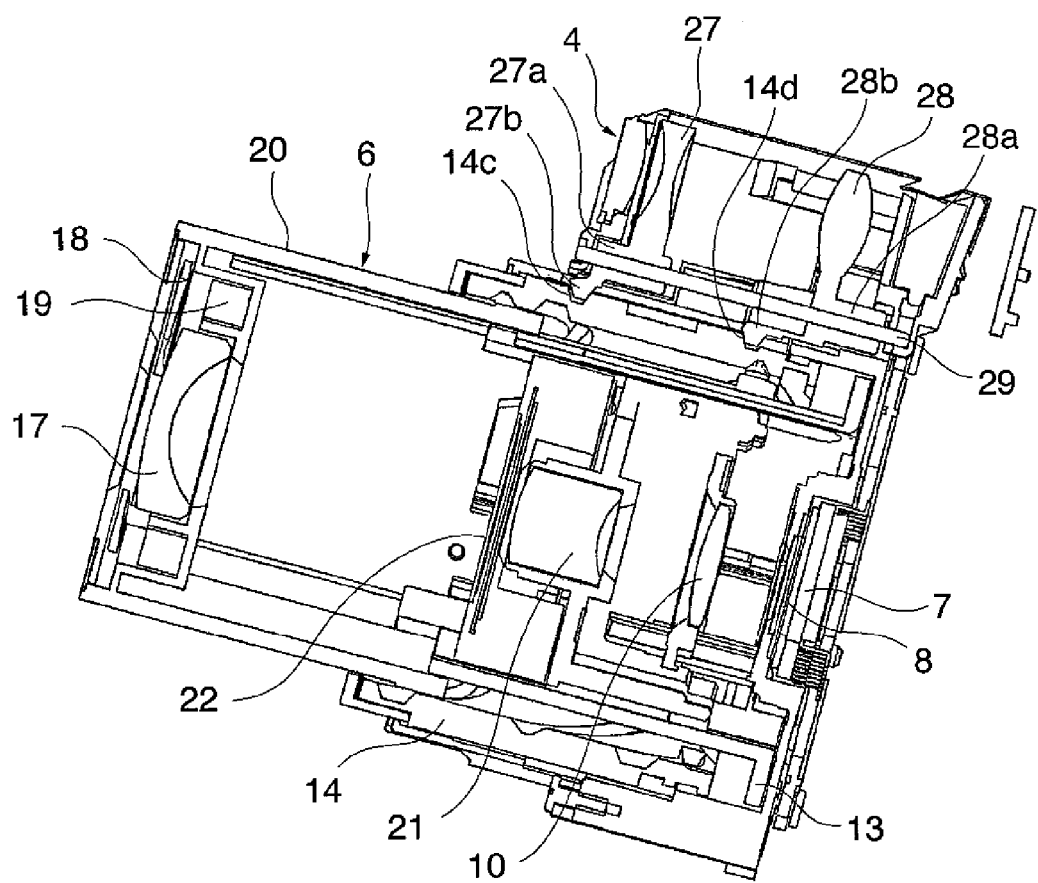
FIG. 10 is a sectional view, taken along the line C-C, of the lens barrel which is in the wide state.
Figure 11:
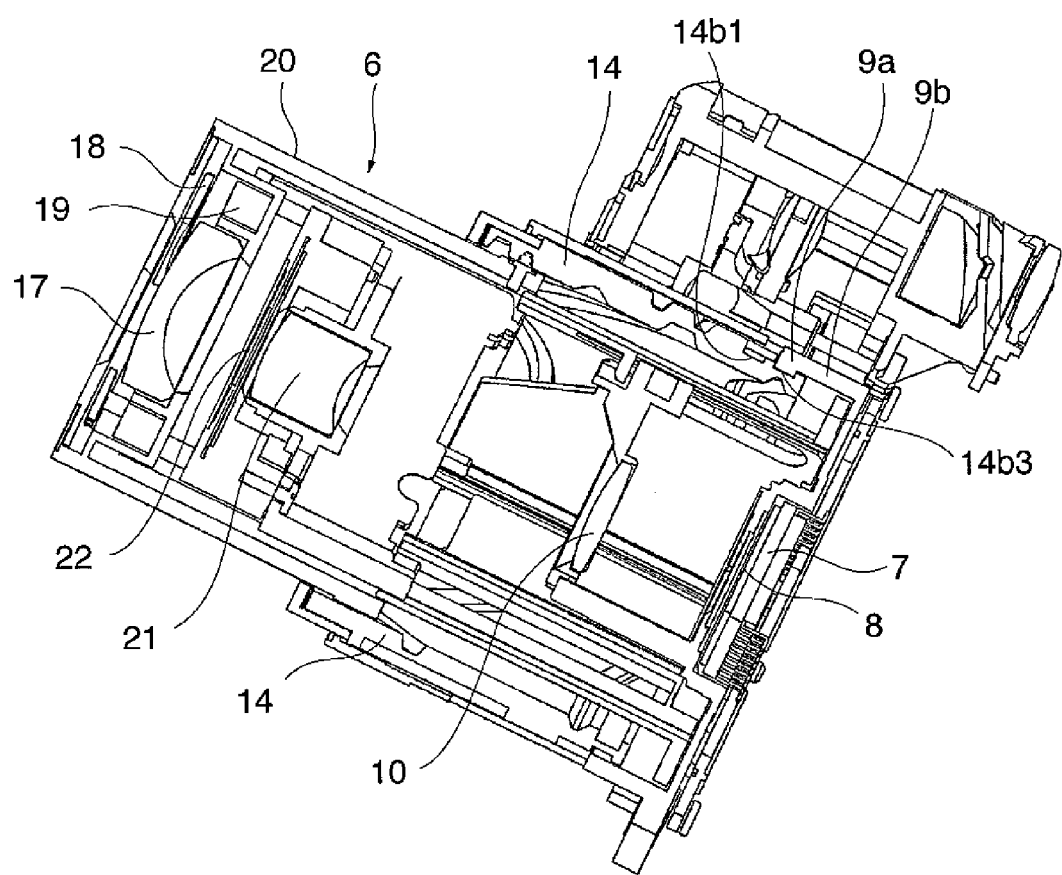
FIG. 11 is a sectional view, taken along the line B-B, of the lens barrel which is in a telephoto state.
Figure 12:
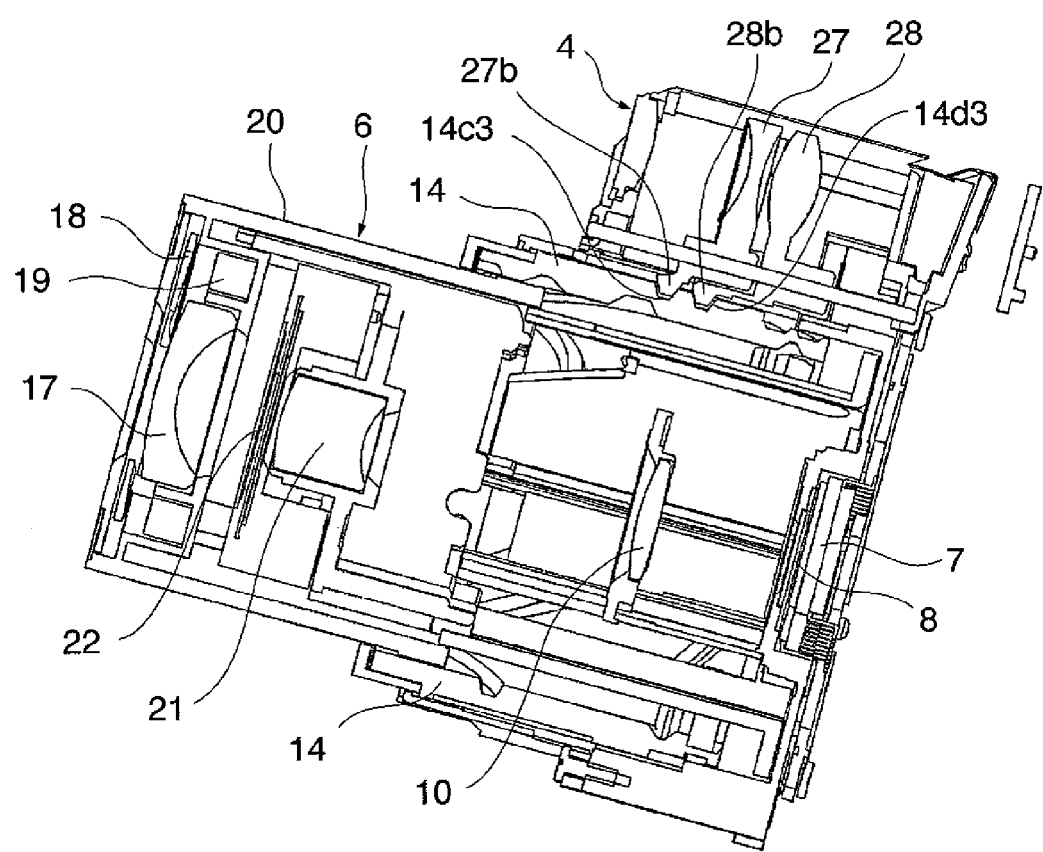
FIG. 12 is a sectional view, taken along the line C-C, of the lens barrel 6 which is in the telephoto state.

In addition, FIG. 8 is a sectional view, taken along the line A-A, of the lens barrel 6 according to the first embodiment, which is in a wide-angle state, FIG. 9 is a sectional view, taken along the line B-B, of the lens barrel 6 which is in the wide-angle state, and FIG. 10 is a sectional view, taken along the line C-C, of the lens barrel 6 which is in the wide state. FIG. 11 is a sectional view, taken along the line B-B, of the lens barrel 6 which is in a telephoto state, and FIG. 12 is a sectional view, taken along the line C-C, of the lens barrel 6 which is in the telephoto state.

At the time of not shooting, the lens barrel 6 is in a retracted (collapsed) state as shown in FIGS. 3 and 4, whereas at the time of shooting, in order to project the lens barrel 6 in the retracted state from the camera body, an operator operates an operation member mounted on the exterior member 3 to control the zoom motor through a circuit on the hard board (not shown), thereby allowing the drive ring 14 to rotate.

As mentioned above, rotation of the drive ring 14 causes, the portion of the bayonet keyway 14b into which the bayonet key 9a is fitted to shift from the collapsing region 14b1 through the transition region 14b2 to the shooting region 14b3. Then, according to the lift of the transition region 14b2 with respect to the optical axis direction, the drive ring itself moves in the optical axis direction.

In addition, rotation of the drive ring 14 causes the first group barrel 20 and the second group holder 24 to project in the optical axis direction, and further controlling the lens telescopic mechanism causes the third lens group 10 to be moved in the optical axis direction. Therefore, the shooting optical system in the lens barrel 6 (the first lens group 17, the second lens group 21, and the third lens group 10) is located at a wide-angle shooting position as shown in FIGS. 8, 9, and 10, or at a telephoto shooting position as shown in FIGS. 11 and 12. These figures show that, in these shooting positions, the bayonet key 9a is fitted into the shooting region 14b3 of the bayonet keyway 14b, and that the drive ring 14 is projected together with the first group barrel 20 and the second group holder 24 in comparison with the lens barrel retracted (collapsed) state as shown in FIGS. 3 and 4.

Furthermore, as shown in FIGS. 10 and 12, the optical system (the finder lenses 27, 28) of the finder unit 4 is controlled in the optical axis direction-wise position, according to the shooting position (wide-angle/telephoto) of the shooting optical system in the lens barrel 6.

Then, when a release operation is made when the lens barrel 6 is in the shooting state, the camera 1 performers exposure, image processing, and image recording using publicly-known automatic focusing control processing (AF) and automatic exposure processing (AE).

According to this embodiment, since the bayonet key 9a formed in the cylindrical portion 9b of the CCD holder 9 is fitted into the bayonet keyway 14b of the drive ring 14, rotation of the drive ring 14 enables the drive ring 14 itself to advance or retreat in the optical axis direction in response to the lift of the transition region 14b2 of the bayonet keyway 14b.

On the other hand, since the pin portion 20a is fitted to the first group cam groove 14e of the drive ring 14, rotation of the drive ring 14 causes the first group barrel 20 to which the first lens group 17 is fixed to advance or retreat in the optical axis direction along the first group cam groove 14e. In addition, since the cam pin 24a is fitted into the second group cam groove 14f of the drive ring 14, rotation of the drive ring 14 causes the second group holder 24 to which the second lens group 21 is fixed to advance or retreat in the optical axis direction along the second group cam groove 14f. Then, the drive ring 14 itself which transfers its driving force to the first group barrel 20 and the second group holder 24 also advances or retreats in the optical axis direction while rotating, as mentioned above.

In this way, it is possible to add a movement amount of the drive ring 14 itself to movement amounts of the first group barrel 20 and the second group holder 24 in the drive ring 14, thereby providing a plenty projecting amount of the shooting lens. Therefore, the present lens barrel has a lager total length in the shooting state, compared with a conventional lens barrel, provided that both these lens barrels are identical in collapsed length with each other.

In addition, this embodiment is so constructed to drive the finder lenses 27, 28 in conjunction with the lens barrel 6. In such a construction, the transition region 14c2 of the finder cam groove 14c, and the transition region 14d2 of the finder cam groove 14d which are provided in the drive ring 14 are approximately parallel in cam track to the transition region 14b2 of the bayonet keyway 14b. Therefore, even if the drive ring 14 moves in the optical axis direction in the transition region 14b2, the finder lenses 27, 28 cannot move. As a result, an optical axis direction-wise movement of the drive ring 14 provides no interference with a zooming operation of the finder unit 4. In addition, since it is not necessary to provide around the finder lenses 27, 28 an excessive space required for the finder lens escaping in connection with the movement of the drive ring 14, besides a space for the finder lenses 27, 28 moving at the time of shooting, it is possible to further miniaturize the finder unit and the camera body.

Next, a second embodiment in which a drive ring moving in an optical axis direction is applied to a multistage collapsible mount type lens barrel, as is the case with the first embodiment, will be described with reference to FIGS. 13 to 15. Moreover, component elements identical to those in the first embodiment are designated by identical reference numerals, descriptions of which are, therefore, omitted.

<Construction of Lens Barrel and its Periphery>

Figure 13:
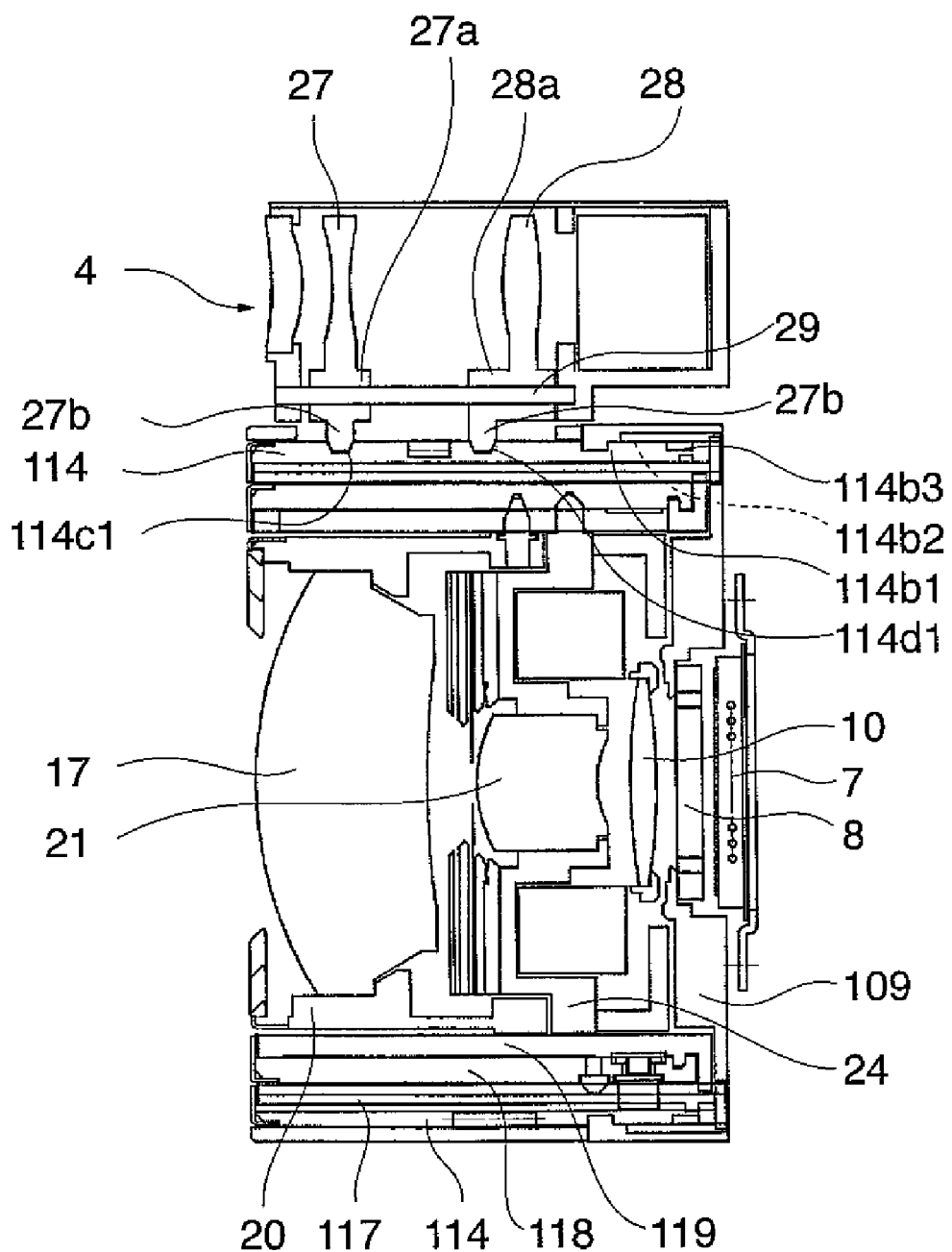
FIG. 13 is a sectional view of a multistage collapsible mount type lens barrel according to a second embodiment, which is in a retracted state.

FIG. 13 is a sectional view of a multistage collapsible mount type lens barrel according to the second embodiment of the present invention, which is in a retracted state, where this figure corresponds to the A-A section of FIG. 2.

The multistage collapsible mount type lens barrel of this embodiment has, in the named order, a first linearly-moving barrel 117, a cam barrel 118, and a second linearly-moving barrel 119, all of which are cylindrical, between a drive ring 114 characterizing this embodiment and a first group barrel 20.

The drive ring 114 characterizing this embodiment has, formed on its outer peripheral surface, three bayonet keyways 114b comprised of a collapsing region 114b1 (corresponding to 14b1 in FIG. 6), a transition region 114b2 (corresponding to 14b2 in FIG. 6), and a shooting region 114b3 (corresponding to 14b3 in FIG. 6), a finder cam groove 114c (corresponding to 14c in FIG. 6) for driving the finder lens 27 in the optical axis direction, and a finder cam groove 114d (corresponding to 14d in FIG. 6) for driving the finder lens 28 in the optical axis direction. Furthermore, the drive ring 14 has, formed on its inner peripheral surface, three drive keyways 114e and three bayonet keyways 114f, respectively.

In addition, a transition region 114c2 (corresponding to 14c2 in FIG. 6) of the finder cam groove 114c, and a transition region 114d2 (corresponding to 14d2 in FIG. 6) of the finder cam groove 114d, which are disposed in the drive ring 114, are approximately parallel in cam track to the transition region 114b2 of the bayonet keyway 114b.

The first linearly-moving barrel 117 has a linearly-moving key 117a on its bottom face and has a bayonet key 117b on its outer peripheral surface, and further has a linearly-moving keyway 117c and three cam grooves 117d on its inner peripheral surface. The linearly-moving key 117a is fitted into a linearly-moving keyway 109c of a CCD holder 109 supporting the lens barrel according to this embodiment, to thereby restrict the first linearly-moving barrel 117 so as to linearly move in the optical axis direction. The bayonet key 117b is fitted into the bayonet keyways 114f of the drive ring 114, and holds the drive ring 114 rotatably relatively to the first linearly-moving barrel 117 and integrally in the optical axis direction.

A bayonet key 109a of the CCD holder 109 is fitted into the bayonet keyway 114b of the drive ring 114. When the drive ring 114 rotates, for example, from a lens barrel retracted (collapsed) state to a shooting (e.g., wide-angle) state, a portion of the bayonet keyway 114b into which the bayonet key 109a is fitted shifts from the collapsing region 114b1 through the transition region 114b2 to the shooting region 114b3. Then, according to a lift of the transition region 114b2 in the optical axis direction, the drive ring 114 itself moves in the optical axis direction. The drive ring 114 itself moving in the optical axis direction causes the bayonet key 117b to be fitted into the bayonet keyway 114f, the first linearly-moving barrel 117 moves linearly in the optical axis direction without rotating integrally with the drive ring 114.

The cam barrel 118 has a drive pin 118a and three cam pins 118b on its outer peripheral surface, and further has a first group cam groove 118c, a second group cam groove 118d, and a bayonet keyway 118e on its inner peripheral surface. The drive pin 118a of the cam barrel 118 is fitted into the drive keyway 114e of the drive ring 114, and hence rotation of the drive ring 114 causes its rotating force to be transferred to the cam barrel 118 to thereby rotate the cam barrel 118 around the optical axis. In addition, the cam pin 118b of the cam barrel 118 is fitted into the cam groove 117d of the first linearly-moving barrel, and hence rotation of the cam barrel 118 causes the cam barrel 118 to move in the optical axis direction along the cam groove 117d.

The second linearly-moving barrel 119 has a linearly-moving key 119a on its bottom face and has a bayonet key 119b on its outer peripheral surface, and further has a linearly-moving keyway 119c on its cylindrical portion. The linearly-moving key 119a is fitted into a linearly-moving keyway 117c of the first linearly-moving barrel 117, to thereby restrict the second linearly-moving barrel 119 so as to linearly move in the optical axis direction. The bayonet key 119b is fitted into the bayonet keyway 118e of the cam barrel 118, and holds the cam barrel 118 rotatably relatively to the second linearly-moving barrel 119 and integrally in the optical axis direction.

Since three pin portions 20a are fitted into the first group cam groove 118c and then restricted linearly movably by the linearly-moving keyway 119c of the second linearly-moving barrel 119, rotation of the cam barrel 118 allows the first group barrel 20 characterizing this embodiment to move in the optical axis direction along the first group cam groove 118c without rotating.

In addition, since three cam pins 24a are fitted into the second group cam groove 118d and then restricted linearly movably by the linearly-moving keyway 119c of the second linearly-moving barrel 119, rotation of the cam barrel 118 allows the second group lens holder 24 characterizing this embodiment to move the optical axis direction along the second group cam groove 118d without rotating.

Next, a lens barrel telescopic operation of a digital camera using the multistage collapsible mount type lens barrel with the above-mentioned construction will be described with reference to FIGS. 14 to 15.

Figure 14:
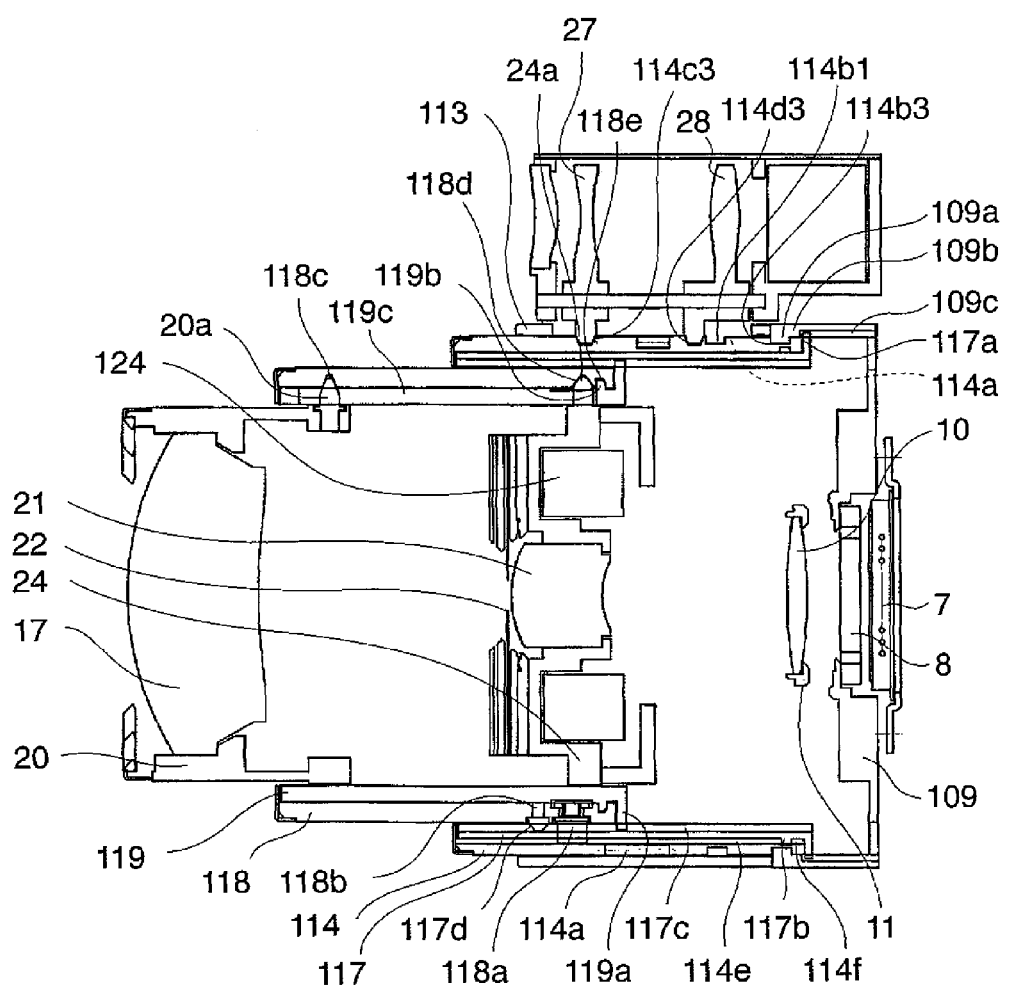
FIG. 14 is a sectional view, taken along the line A-A, of the lens barrel according to the second embodiment, which is in a wide-angle state.
Figure 15:
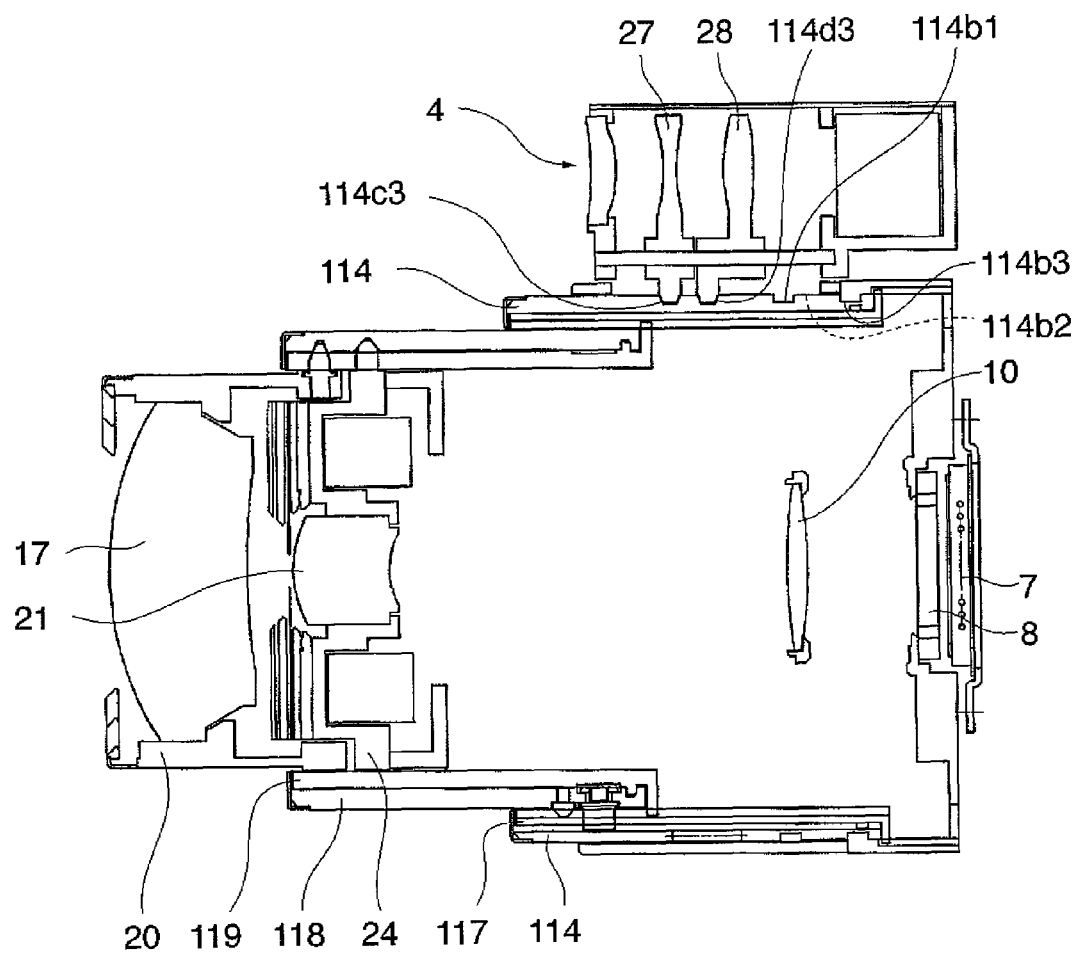
FIG. 15 is a sectional view, taken along the line A-A, of the lens barrel which is in the telephoto state.

FIG. 14 is a sectional view, taken along the line A-A, of the lens barrel according to the second embodiment, which is in a wide-angle state, and FIG. 15 is a sectional view, taken along the line A-A, of the lens barrel which is in the telephoto state.

When an operator operates an operation member on the exterior member 3 in the lens barrel retracted (collapsed) state shown in FIG. 14, to control a zoom motor through a circuit on a hard board, thereby allowing the drive ring 114 to rotate.

Rotation of the drive ring 114 causes a portion of the bayonet keyway 114b into which the bayonet key 109a is fitted to shift from the collapsing region 114b1 through the transition region 114b2 to the shooting region 114b3, as is the case with the first embodiment. Then, according to the lift of the transition region 114b2 in the optical axis direction, the drive ring 114 itself moves in the optical axis direction.

In addition, rotation of the drive ring 114 causes the cam barrel 118, the first group barrel 20, and the second group holder 24 to project in the optical axis direction, and further controlling the lens telescopic mechanism causes the third lens group 10 to be moved in the optical axis direction, thereby allowing the shooting optical system of the lens barrel to be disposed in the shooting position (a wide-angle state shown in FIG. 14 or a telephoto state shown in FIG. 15).

Furthermore, as shown in FIGS. 14 and 15, the optical system (the finder lenses 27, 28) of the finder unit 4 in the optical axis direction is also controlled in position, according to the shooting position (wide-angle/telephoto) of the photographic optical system in the lens barrel.

According to this embodiment, rotation of the drive ring 114 causes its rotating force to be transferred to the cam barrel 118 to thereby rotate the cam barrel 118 around the optical axis, and further rotation of the cam barrel 118 causes the cam barrel 118 to move in the optical axis direction along the cam groove 117d. In addition, rotation of the cam barrel 118 causes the first group barrel 121 to which the first lens group 120 is fixed to advance or retreat in the optical axis direction along the first group cam groove 118c. Then, rotation of the cam barrel 118 causes the second group holder 125 to which the second lens group 122 is fixed to advance or retreat in the optical axis direction along the second group cam groove 118d. Further, the drive ring 114 itself which transfers a driving force to the cam barrel 118, the first group barrel 121, and the second group holder 125 also advances or retreats while rotating in the optical axis direction according to the lift of the transition region 114b2 of the bayonet keyway 114b, as is the case with the first embodiment.

In this way, also in the multistage collapsible mount type lens barrel, it is possible to add a movement amount of the drive ring 114 itself to movement amounts of the cam barrel 118, the first group barrel 121, and the second group holder 125, thereby providing a greater projecting amount of the shooting lens than ever before.

In addition, as is the case with the above-mentioned first embodiment, the transition region 114c2 of the finder cam groove 114c, and the transition region 114d2 of the finder cam groove 114d which are provided in the drive ring 114 are approximately parallel in cam track to the transition region 114b2 of the bayonet keyway 114b. Therefore, a movement of the drive ring 114 provides no interference with a zooming operation of the finder unit 4. In addition, since it is not necessary to provide in the finder unit 4 an excessive space required for the finder lens escaping in connection with the movement of the drive ring 114, it is possible to further miniaturize the finder unit and the camera body.

A third embodiment in which the drive ring of the above-mentioned first or second embodiment is applied to a zooming type strobe mechanism will be described with reference to FIGS. 16 to 19.

<Construction of Drive Ring and Strobe>

Figure 16:
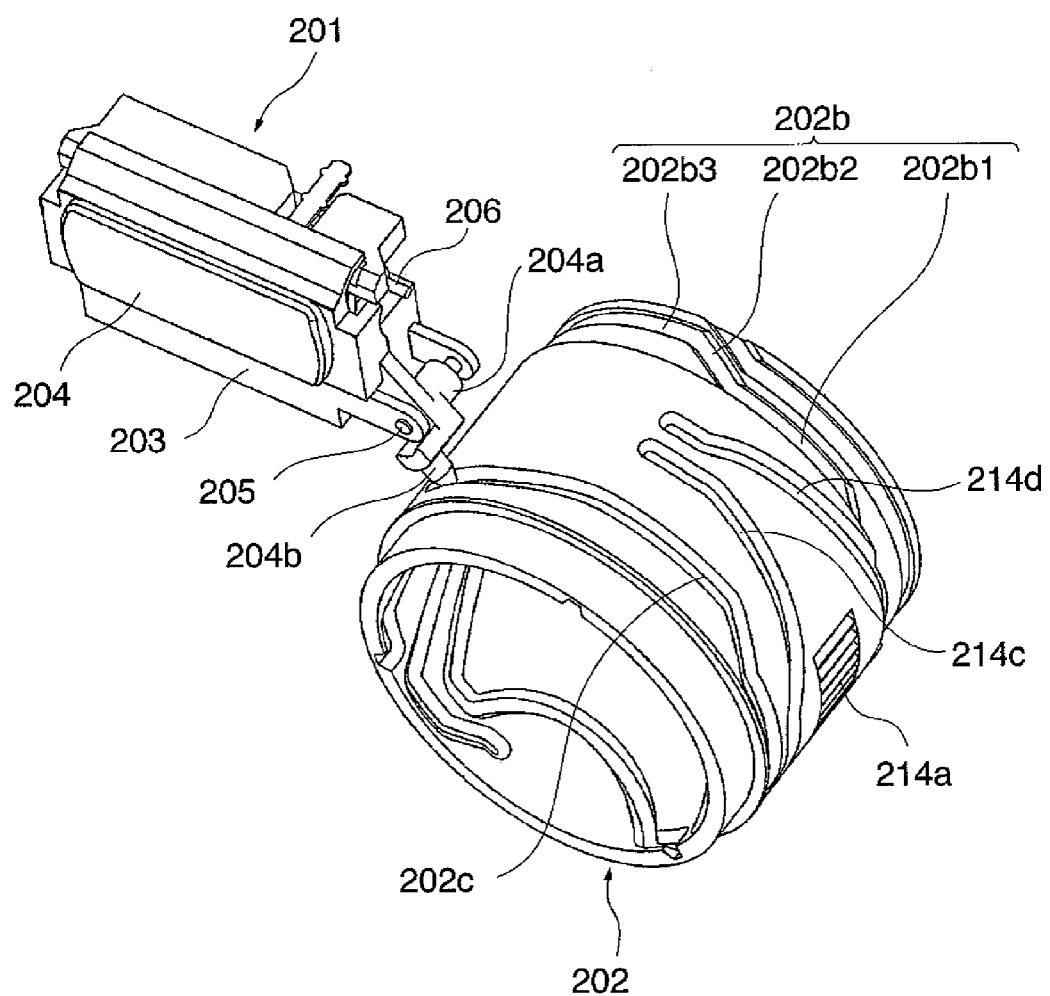
FIG. 16 is a perspective view showing a main part of a digital camera which has a lens barrel according to a third embodiment.

FIG. 16 is a perspective view showing a main part of a digital camera which has a lens barrel according to the third embodiment, while showing a relationship between the drive ring and zooming type strobe characterizing this embodiment.

In this figure, the camera body has a zooming type strobe 201 fixed thereto. The zooming strobe 201 has a strobe holder 203, a Fresnel lens 204, a guide bar 205, and a flash discharge tube 206, and is further comprised of a reflector (not shown) housed inside the strobe holder 203, and a strobe circuit (not shown). This zooming type strobe 201 is so constructed so as to be able to change an illuminating angle of a light emitted from the flash discharge tube 206 as a light source, according to a shooting position of a shooting optical system of the lens barrel. The Fresnel lens 204 has a sleeve 204a and a cam pin 204b, and is supported linearly movably in the optical axis direction since the sleeve 204a is fitted into a guide bar 205.

A drive ring 202 characterizing this embodiment has, formed on its outer peripheral surface, three bayonet keyways 202b comprised of a collapsing region 202b1 (corresponding to 14b1 in FIG. 6), a transition region 202b2 (corresponding to 14b2 in FIG. 6), and a shooting region 202b3 (corresponding to 14b3 in FIG. 6), and a Fresnel lens cam groove 202c for driving the Fresnel lens 204 in the optical axis direction, as is the case with the first or second embodiments.

Figure 18:
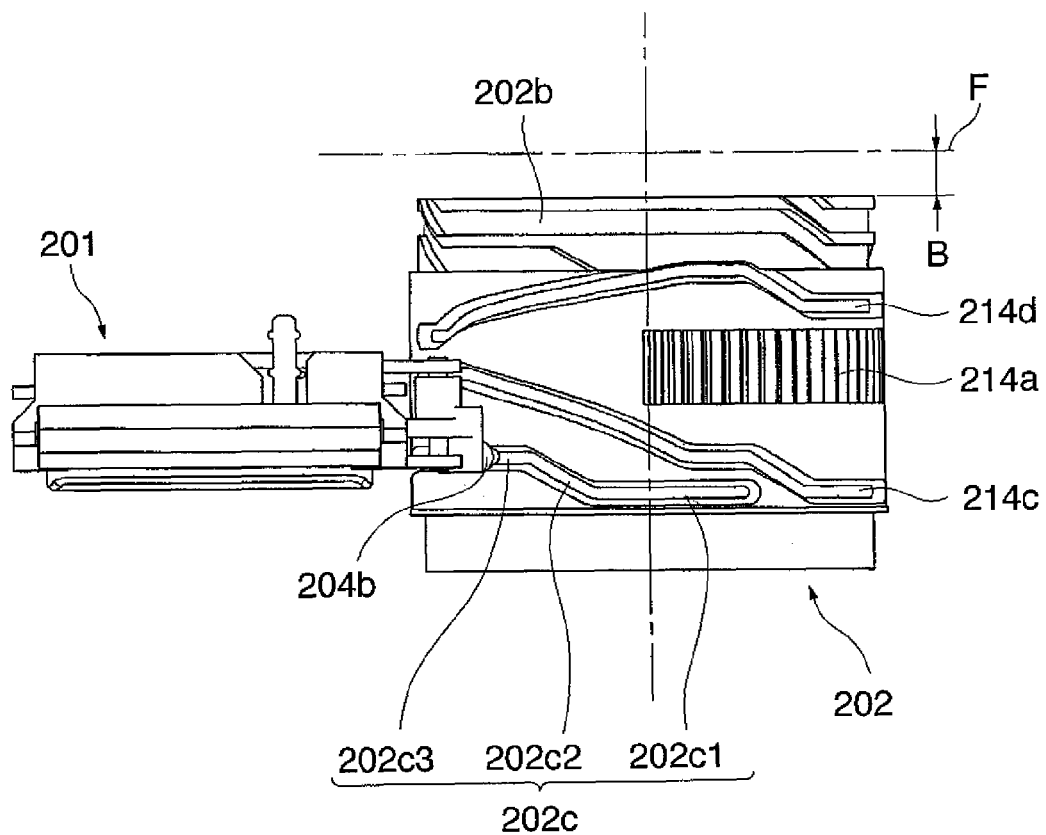
FIG. 18 is a top view showing a relationship between the zooming type strobe and the drive ring when the lens barrel is in a wide-angle state.
Figure 19:
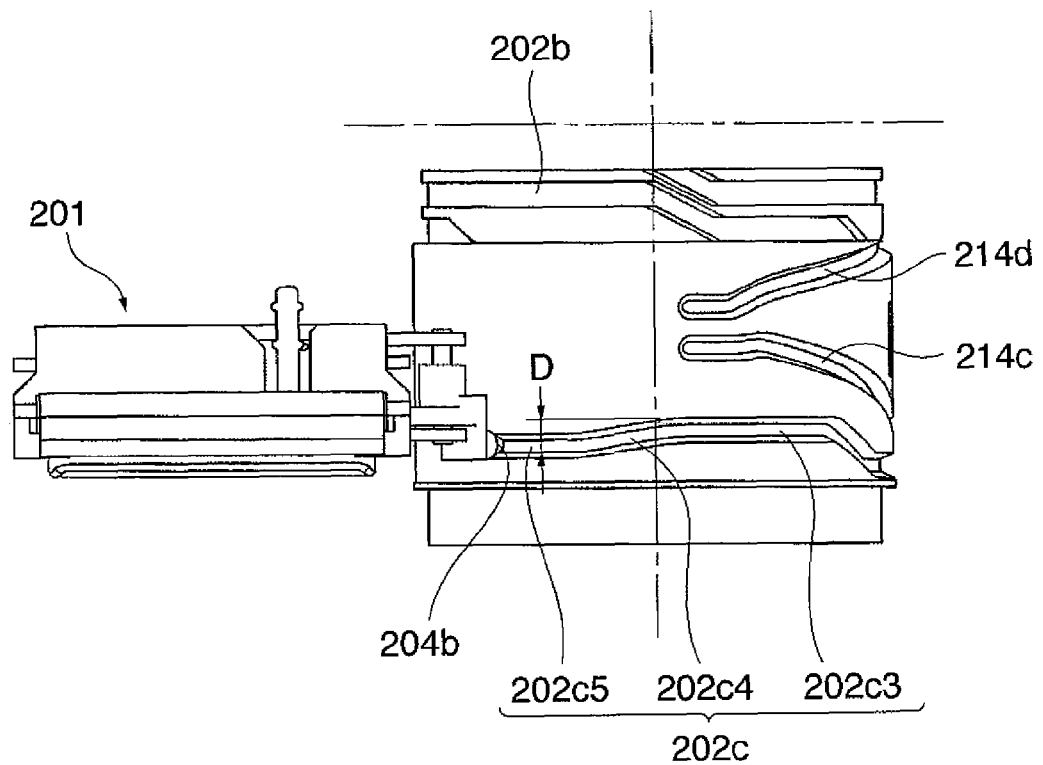
FIG. 19 is a top view showing a relationship between the zooming type strobe and the drive ring when the lens barrel is in a telephoto state.

The Fresnel lens cam groove 202c is comprised of a collapsing region 202c1, a transition region 202c2, a wide-angle shooting region 202c3, a zooming region 202c4, and a telephoto region 202c5, as shown in FIGS. 18 and 19. In addition, as is the case with the first or second embodiment, a bayonet key (not shown) of the CCD holder is fitted into the bayonet keyway 202b of the drive ring.

The cam pin 204b of the Fresnel lens 204 is fitted into the Fresnel lens cam groove 202c of the drive ring 202, and hence moving in the optical axis direction while being supported by the guide bar 205 according to lift of the Fresnel lens cam groove 202c, thereby enabling its strobe illumination angle to be changed.

Next, in the digital camera which has the above-mentioned zooming type strobe mechanism, a relationship between a movement of the drive ring 202 and the Fresnel lens 204 will be described with reference to FIGS. 17 to 19.

Figure 17:
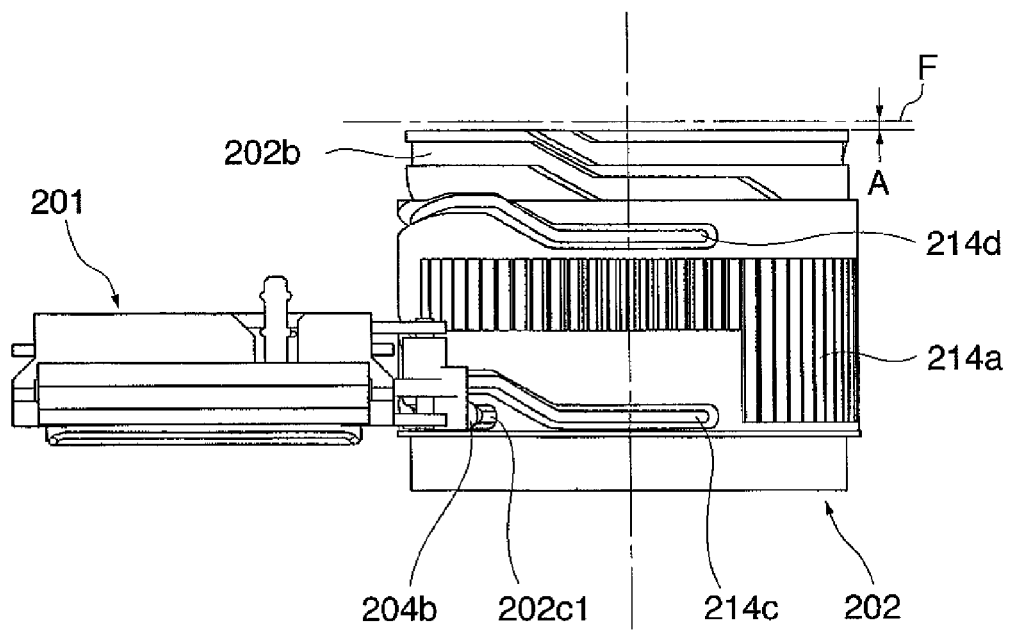
FIG. 17 is a top view showing a relationship between a zooming type strobe and a drive ring when the lens barrel is retracted.

Moreover, FIG. 17 is a top view showing a relationship between the zooming type strobe and the drive ring when the lens barrel is retracted, and FIG. 18 is a top view showing a relationship between the zooming type strobe and the drive ring when the lens barrel is in a wide-angle state. Furthermore, FIG. 19 is a top view showing a relationship between the zooming type strobe and the drive ring when the lens barrel is in a telephoto state.

When the drive ring 202 rotates, for example, from the lens barrel retracted (collapsed) state to a shooting (for example, wide-angle) state by a zoom motor, a portion of the bayonet keyway 202b into which the bayonet key is fitted shifts from the collapsing region 202b1 through the transition region 202b2 to the shooting region 202b3. Then, according to a lift of the transition region 202b2 in the optical axis direction, the drive ring 202 itself moves only by a difference (B−A) between a distance A from an optical axis direction-wise reference position F shown in FIG. 17, and a distance B from an optical axis direction-wise reference position F shown in and FIG. 18.

The drive ring 202 has, on its inner peripheral surface, a mechanism of moving the shooting optical system between a lens barrel retracted state and a shooting state, as is the case with the first or second embodiment. When the drive ring 202 is in the lens barrel retracted state as shown in FIG. 17, the cam pin 204b is in the collapsing region 202c1 of the Fresnel lens cam groove 202c.

When the drive ring 202 rotates to project by a distance (B−A) to the wide-angle position shown in FIG. 18, the transition region 202c2 has a lift amount C in such a direction as to cancel a projecting amount of the drive ring 202 (refer to FIG. 18). This prevents the cam pin 204b from moving in the optical axis direction, thereby eliminating the need for an excessive space in connection with the movement of the drive ring 202.

When the drive ring 202 rotates from the wide-angle state shown in FIG. 18 to the telephoto state shown in FIG. 19, the cam pin 204b moves in the optical axis direction by a lift amount D of the zooming region 202c4, thereby enabling its strobe illumination angle to be changed.

This embodiment is so constructed to zoom the strobe in conjunction with the lens barrel. In such a construction, it is possible to allow the shooting lens to have a lager total length, even in a case where the collapsed lens barrel length is short. That is, in the lens barrel with the construction of the drive ring telescoping in the optical axis direction like the above-mentioned first embodiment, the drive ring 202 has the cam groove 202c for zooming the strobe illumination angle, in which the cam pin 204b in a side of the strobe 201 is fitted. Therefore, rotation of the drive ring 202 provides a greater telescoping amount of the shooting lens than ever before, and realizes a strobe illumination angle zooming mechanism.

Furthermore, the transition region 202c2 of the cam groove 202c provided in the drive ring 202 has a lift amount in such a direction as to cancel a projecting amount of the drive ring 202, which prevents the Fresnel lens 204 from moving even when the drive ring 202 moves in the optical axis direction in the transition region 202b2. Therefore, a movement of the drive ring 202 provides no interference with a zooming operation of the strobe. In addition, since it is not necessary to provide an excessive space required for the finder lens escaping around the Fresnel lens 204 in connection with the movement of the drive ring 202, it is possible to further miniaturize the camera body.

A fourth embodiment in which the drive ring of the above-mentioned first or second embodiment is applied to a retractable mechanism of a strobe will be described with reference to FIGS. 20 to 24.

<Construction of Drive Ring and Strobe>

Figure 20:
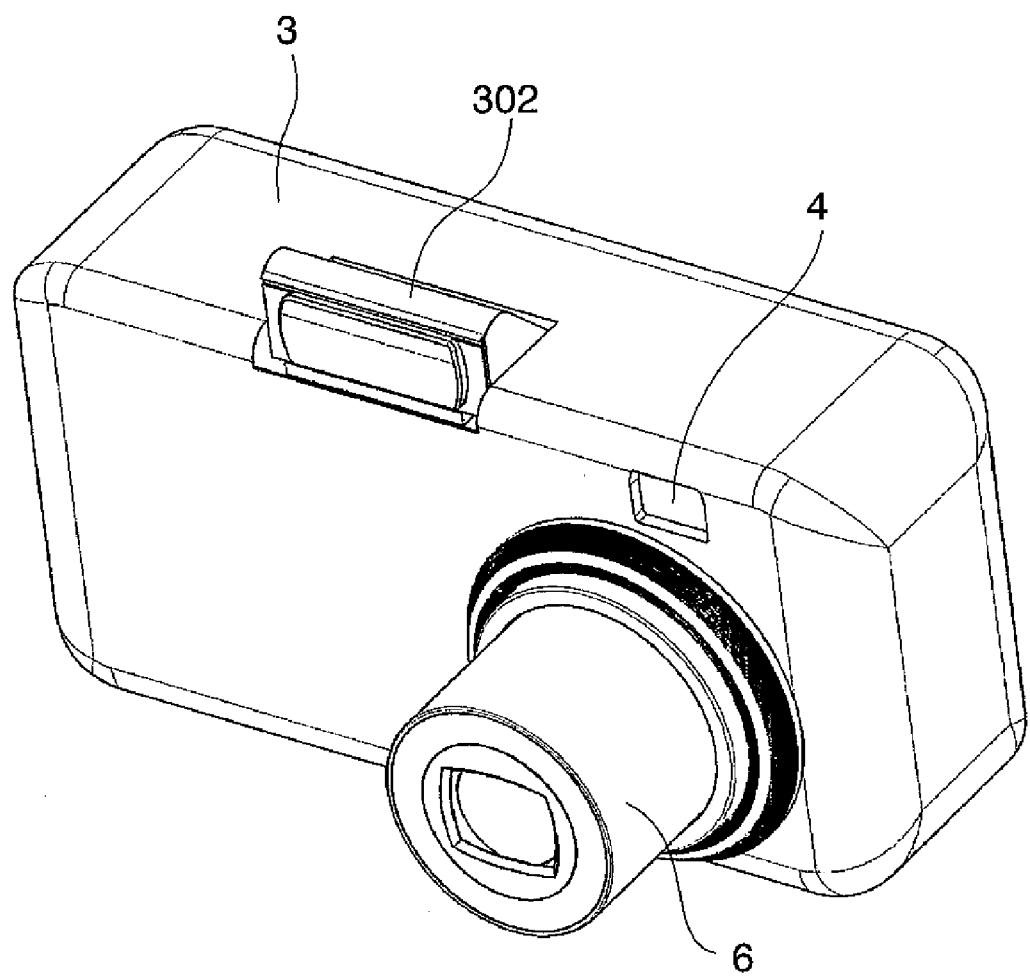
FIG. 20 is an external perspective view of a digital camera which has a lens barrel according to a fourth embodiment.

FIG. 20 is an external perspective view of a digital camera which has a lens barrel according to a fourth embodiment of the present invention. Moreover, component elements identical to those in FIG. 1 are designated by identical reference numerals, descriptions of which are, therefore, omitted.

In this drawing, a strobe 302 characterizing this embodiment is of a retractable type. This retractable type strobe 302 is so adapted that its strobe body stands up during use of the camera, to make flash shooting available. In addition, during no use of the camera, the strobe body is housed in the retracted position inside the camera body. Accordingly, it is possible to make the camera compact without decreasing its portability.

Figure 21:
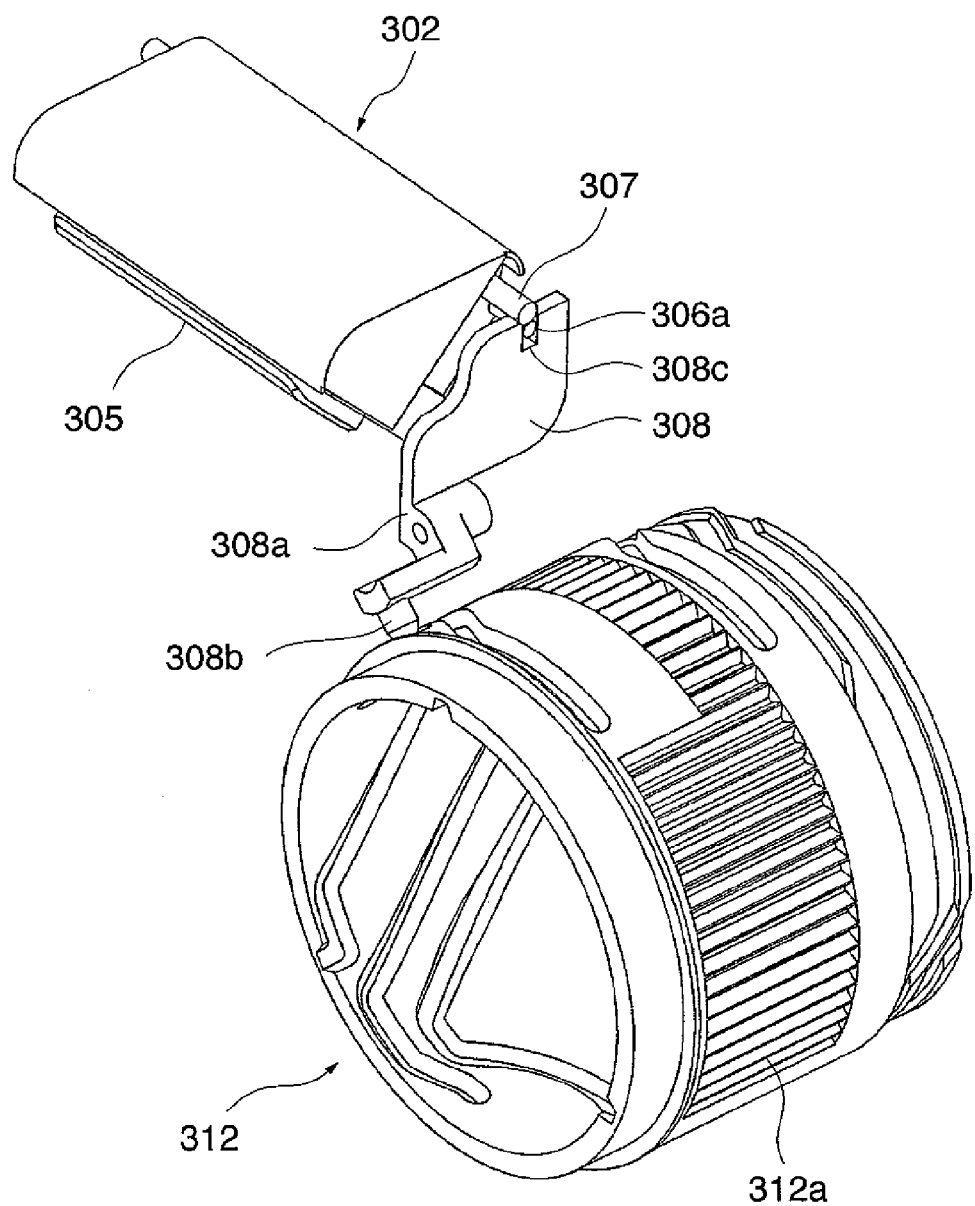
FIG. 21 is a perspective view of a main part of the digital camera, showing a relationship between a retractable type strobe and a drive ring when the lens barrel is in a retracted state.
Figure 22:
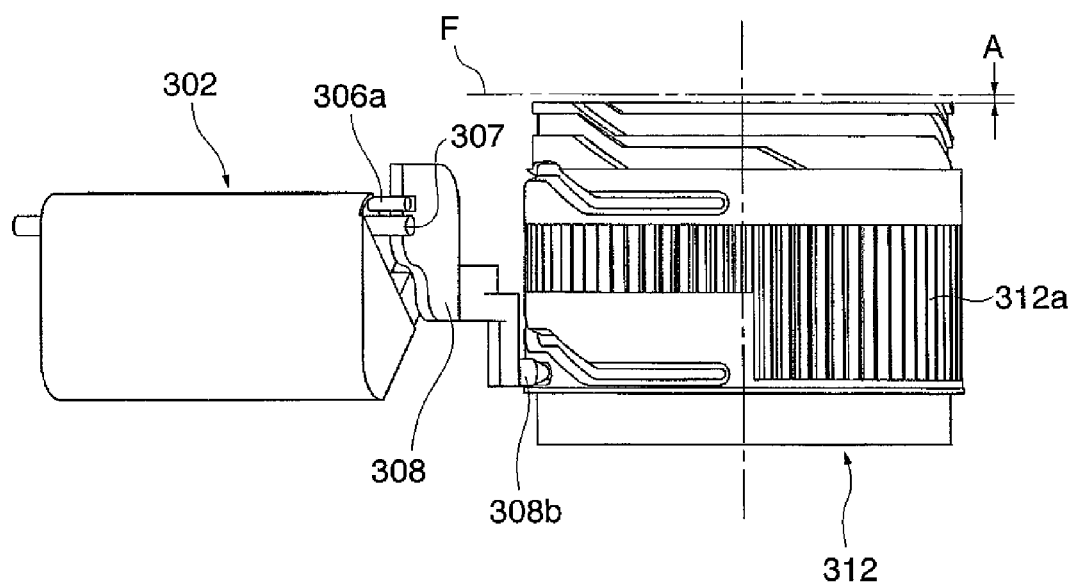
FIG. 22 is a top view the main part of the digital camera, showing a relationship between the retractable type strobe and drive ring in the retracted state.

FIG. 21 is a perspective view of a main part of the digital camera showing a relationship between the retractable type strobe and the drive ring when the lens barrel is in the retracted state, and FIG. 22 is a top view thereof. In addition, FIG. 23 is a perspective view of a main part of the digital camera showing a relationship between the retractable type strobe and the drive ring when the lens barrel is in the shooting state, and FIG. 24 is a top view thereof.

The retractable type strobe 302 characterizing this embodiment is equipped with a Fresnel lens 305, a strobe holder 306, a rotary shaft 307, and a retractable arm 308, and the Fresnel lens 305 is fixed to the strobe holder 306. The retractable arm 308 has a sleeve 308a, which is fitted into a guide bar (not shown) linearly movably in the optical axis direction of the shooting optical system, a cam pin 308b, and a U-groove 308c.

The strobe holder 306 has a guide pin 306a fitted into the U-groove 308c of the retractable arm 308, and is rotatable around the rotary shaft 307 fixed to a strobe base (not shown). The strobe holder 306 houses, an optical discharge tube therein, which is connected to a strobe circuit (not shown) to perform an emitting operation.

Figure 23:
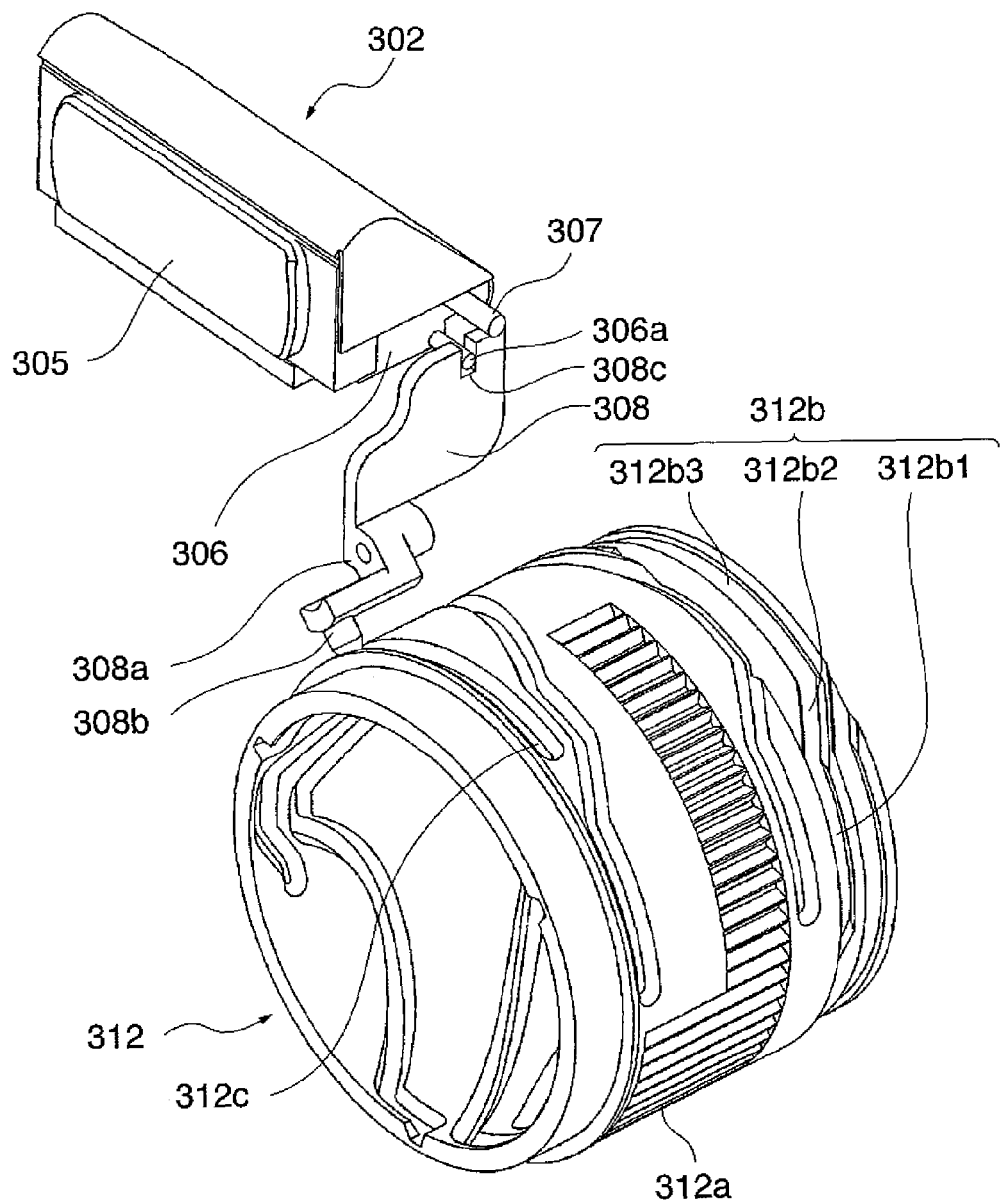
FIG. 23 is a perspective view of the main part of the digital camera, showing a relationship between the retractable type strobe and drive ring when the lens barrel in a shooting state.
Figure 24:
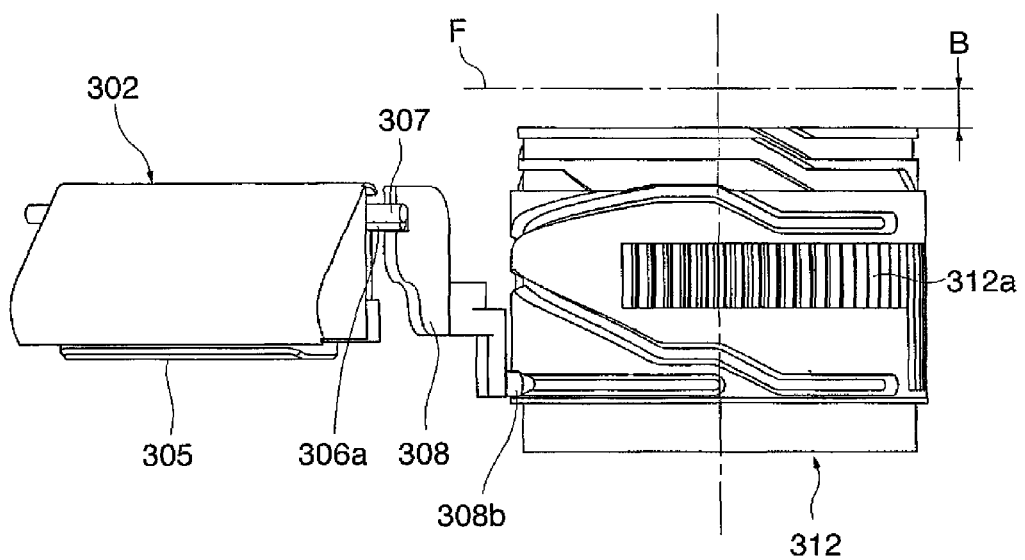
FIG. 24 is a top view the main part of the digital camera, showing a relationship between the retractable type strobe and drive ring in the shooting state.

When the retractable arm 308 moves along the guide bar, the strobe holder 306 rotates around the rotary shaft 307 by the guide pin 306a fitted into the U-groove 308c to retract between the retracted state shown in FIG. 21 and the shooting state shown in FIG. 23.

the other hand, as shown in FIG. 23, the drive ring 312 disposed inside the lens barrel 6, characterizing this embodiment, has, formed on its outer periphery, three bayonet keyways 312b comprised of a collapsing region 312b1 (corresponding to 14b1 in FIG. 6), a transition region 312b2 (corresponding to 14b2 in FIG. 6), and a shooting region 312b3 (corresponding to 14b3 in FIG. 6), and a strobe cam groove 312c into which the cam pin 308b of the retractable arm 308 is fitted, as is the case with the first or second embodiment. Further, the bayonet key of the CCD holder is fitted into the bayonet keyways 312b of the drive ring, as is the case with the first and second embodiment.

Next, in the digital camera which has the above-mentioned retractable mechanism of the strobe, a relationship between a movement of the drive ring 312 and the strobe 302 will be described with reference to FIGS. 22 and 24.

When the drive ring 312 rotates, for example, from a lens barrel retracted (collapsed) state to a shooting (e.g., wide-angle) state by a zoom motor, a portion of the bayonet keyway 312b into which the bayonet key is fitted shifts from the collapsing region 312b1 through the transition region 312b2 to shooting region 312b3. Then, according to a lift of the transition region 312b2 in the optical axis direction, the drive ring 312 itself moves only by a difference (B–A) between a distance A from an optical axis direction-wise reference position shown in FIG. 22, and a distance B from an optical axis direction-wise reference position F shown in FIG. 24.

The drive ring 312 has on its inner peripheral surface a mechanism of moving the shooting optical system between the lens barrel retracted state and the shooting state, as is the case with the first and second embodiment. When the drive ring 312 rotates from the lens barrel retracted state, shown in FIG. 22, to project by the distance (B–A) to the wide-angle position shown in FIG. 24, the cam pin 308b fitted into the strobe cam groove 312c moves by the distance (B–A). As a result, the strobe holder 306 rotates around the rotary shaft 307 by the guide pin 306a fitted into the U-shaped groove 308c, thereby enabling the strobe 302 to be retracted.

This embodiment is so constructed to drive the strobe in conjunction with the lens barrel. In such a construction, it is possible to allow the shooting lens to have a larger length, even in a case where the collapsed lens is short. That is, in a lens barrel with the construction of the drive ring telescoping in the optical axis direction like the above-mentioned first embodiment, the drive ring 312 has the cam groove 312c for retracting the strobe into which the cam pin 308b of the retractable arm 308 in a side of the strobe 302 is fitted. Therefore, rotation of the drive ring 312 provides a greater telescoping amount of the shooting lens than ever before, and realizes a mechanism of retracting the strobe 302.

A fifth embodiment in which the drive ring of the above-mentioned first or second embodiment is applied to a locking mechanism of a sliding type barrier for protecting the lens barrel will be described with reference to FIGS. 25 to 31.

Figure 25:
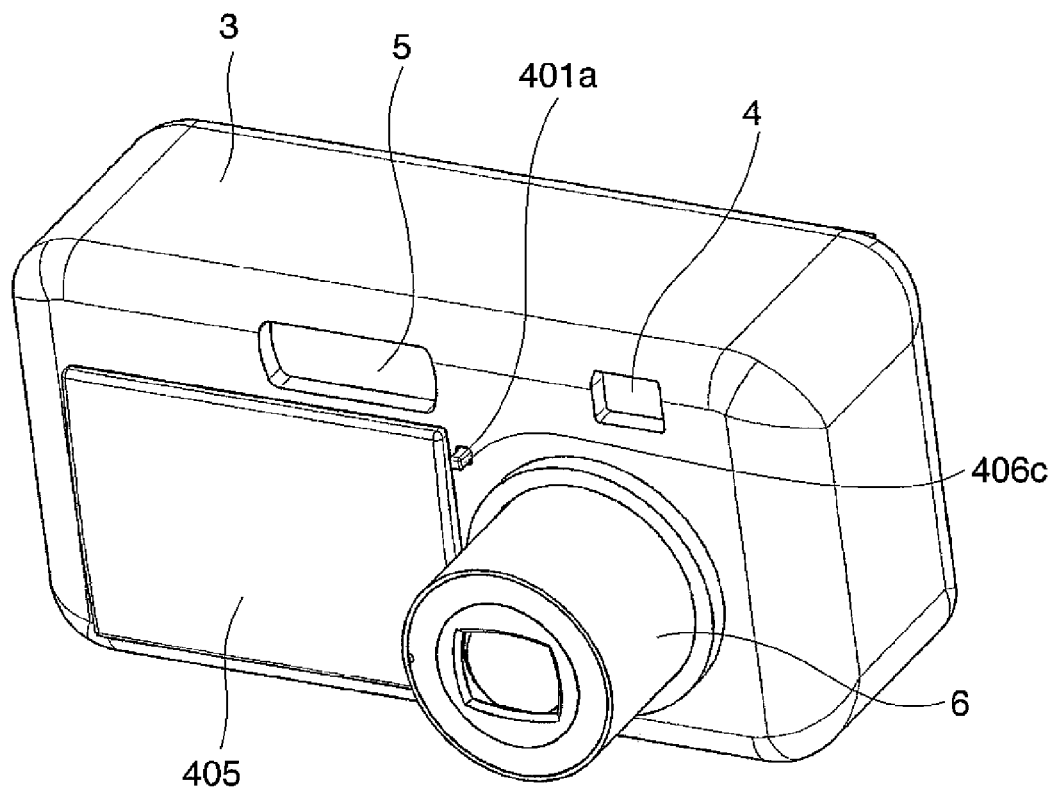
FIG. 25 is an external perspective view of a digital camera, having a locking mechanism of a sliding type barrier, according to a fifth embodiment.
Figure 26:
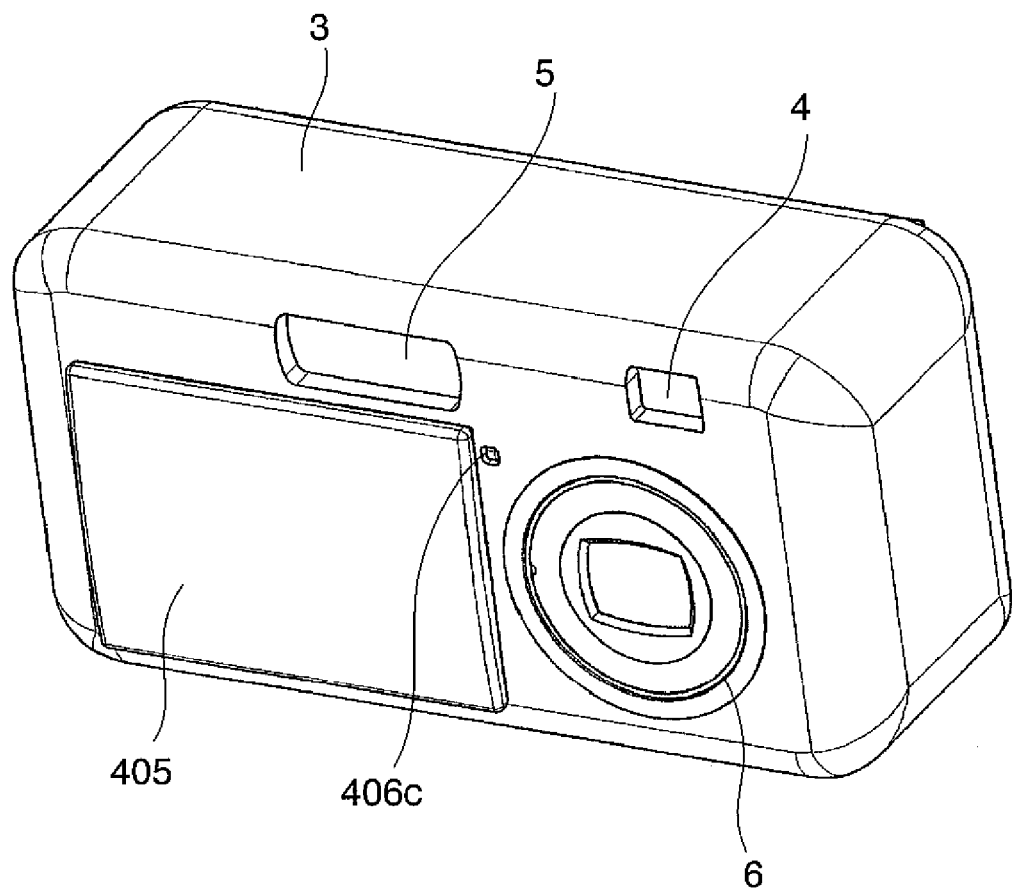
FIG. 26 is an external perspective view of a digital camera, having a locking mechanism of a sliding type barrier, according to a fifth embodiment.
Figure 27:
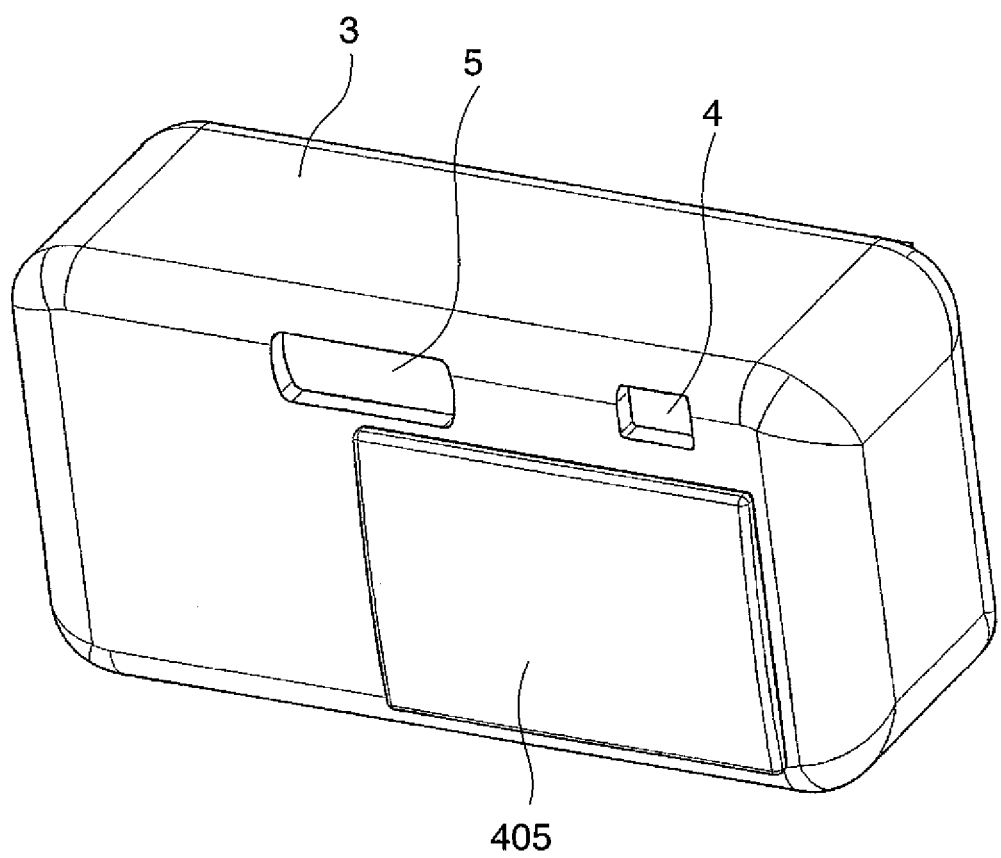
FIG. 27 is an external perspective view of a digital camera, having a locking mechanism of a sliding type barrier, according to a fifth embodiment.

FIGS. 25 to 27 are external perspective views of a digital camera, having a locking mechanism of a sliding type barrier, according to the fifth embodiment of the present invention. Moreover, component elements identical to those in FIG. 1 are designated by identical reference numerals, description of which are, therefore, omitted.

As to a state of the camera shown in FIG. 25, the lens barrel 6 is in a shooting state and a barrier 405 is in an open state. In addition, a locking portion 406c is in a locked state in which it projects from an opening portion 401a of a camera body lest the barrier 405 should close carelessly to thereby interfere with the movement of the lens barrel 6. The barrier 405 is supported slidably in opening and closing directions with respect to the camera body.

As to a state of the camera shown in FIG. 26, the lens barrel 6 is in a retracted state and the barrier 405 is in an open state. The locking portion 406c does not project from the opening portion 401a of the camera body, but is in an unlocked state, and the barrier 405 is made slidable.

As to a state of the camera shown in FIG. 27, the lens barrel 6 is in a retracted state and the barrier 405 is in a closed state. The barrier 405 is slid from the state in FIG. 26 to cover a light introducing portion of the lens barrel 6 which is in the retracted state.

Figure 28:
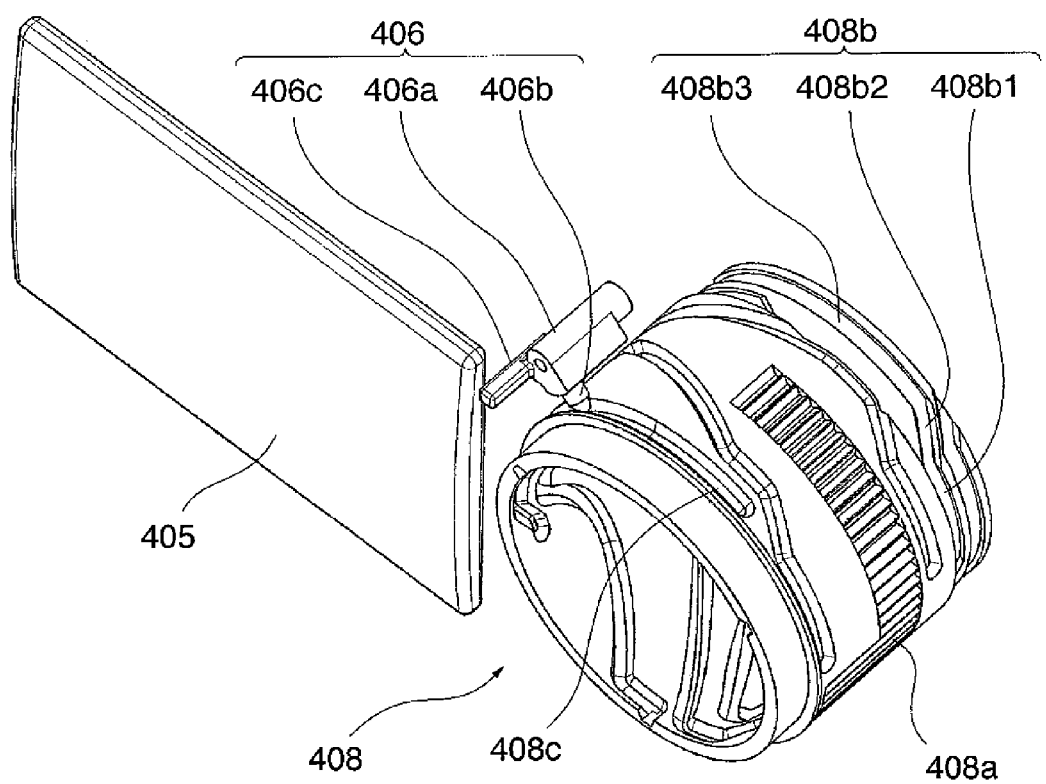
FIG. 28 is a perspective view of the main part of the digital camera, showing a constructional relationship between the barrier and the drive ring when the barrier is in a state shown in FIG. 25.

FIG. 28 is a perspective view of a main part of the digital camera, showing a constructional relationship between the barrier and drive ring when the barrier is in a state shown in FIG. 25.

As shown in FIG. 28, the drive ring 408 and barrier 405 characterizing this embodiment have a constructive relation through a barrier locking lever 406. That is, the barrier locking lever 406 has a sleeve 406a, a cam pin 406b, and the lock portion 406c, and the sleeve 406a is fitted into a guide bar (not shown) which is fixed to the camera body, which causes the barrier locking lever 406 to be supported with the camera body linearly movably in the optical axis direction of the photographic optical system.

In addition, the drive ring 408 disposed in the lens barrel 6 has, formed on its outer peripheral surface, three bayonet keyways 408b comprised of a collapsing region 408b1, a transition region 408b2, and a shooting region 408b3, and a barrier cam groove 408c into which the cam pin 406b of the barrier locking lever 406 is fitted, as is the case with the first and second embodiment. In addition, the bayonet key of the CCD holder is fitted into the bayonet keyway 408b of the drive ring, as is the case with the first and second embodiment. The drive ring 408 has, on its inner peripheral surface, a mechanism of moving the photographic optical system between the lens barrel retracted state the shooting state.

Figure 29:
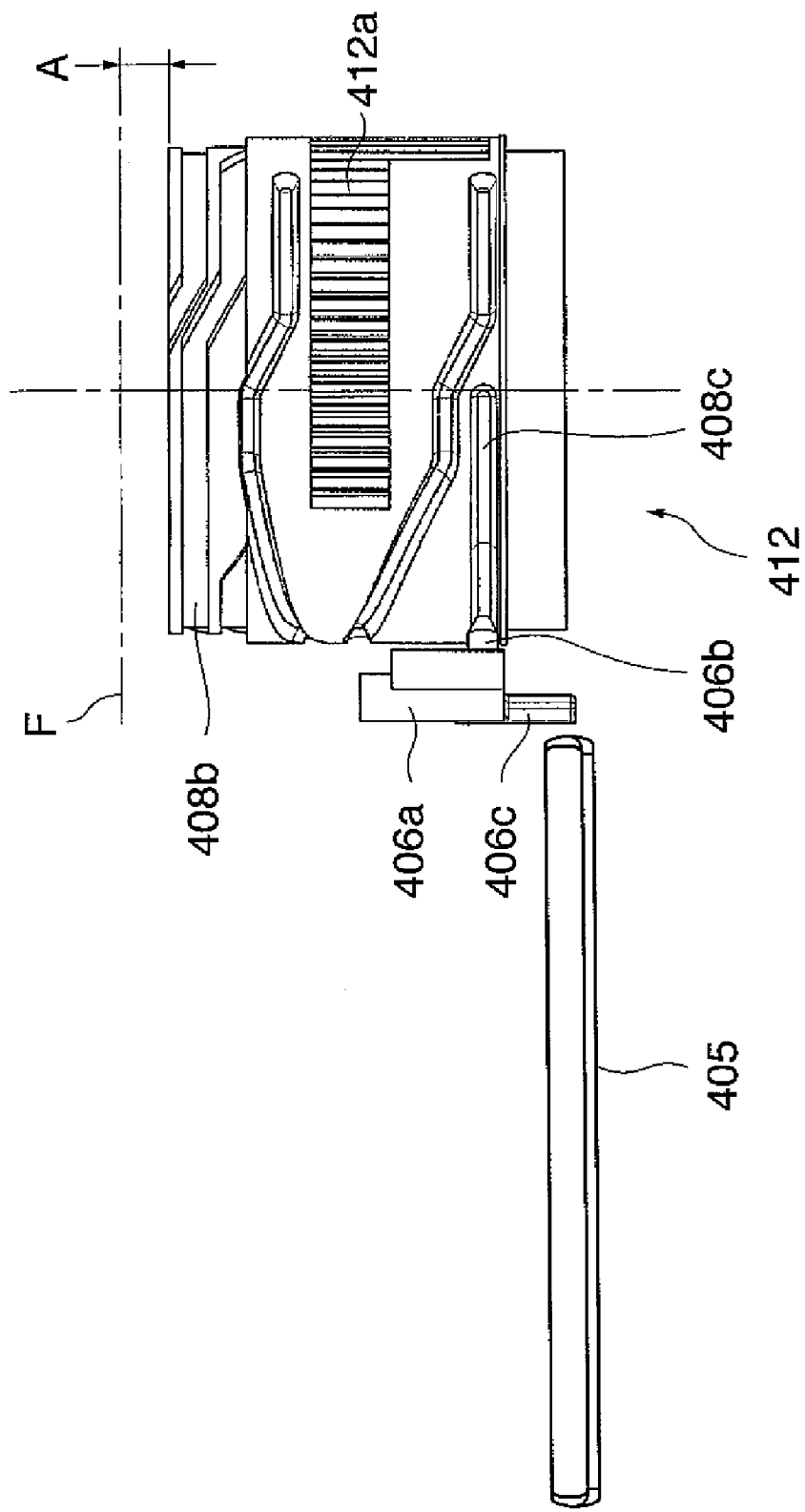
FIG. 29 is a top view of the main part of the digital camera, showing a constructional relationship between the barrier and the drive ring when the barrier is in a state shown in FIG. 25.
Figure 30:
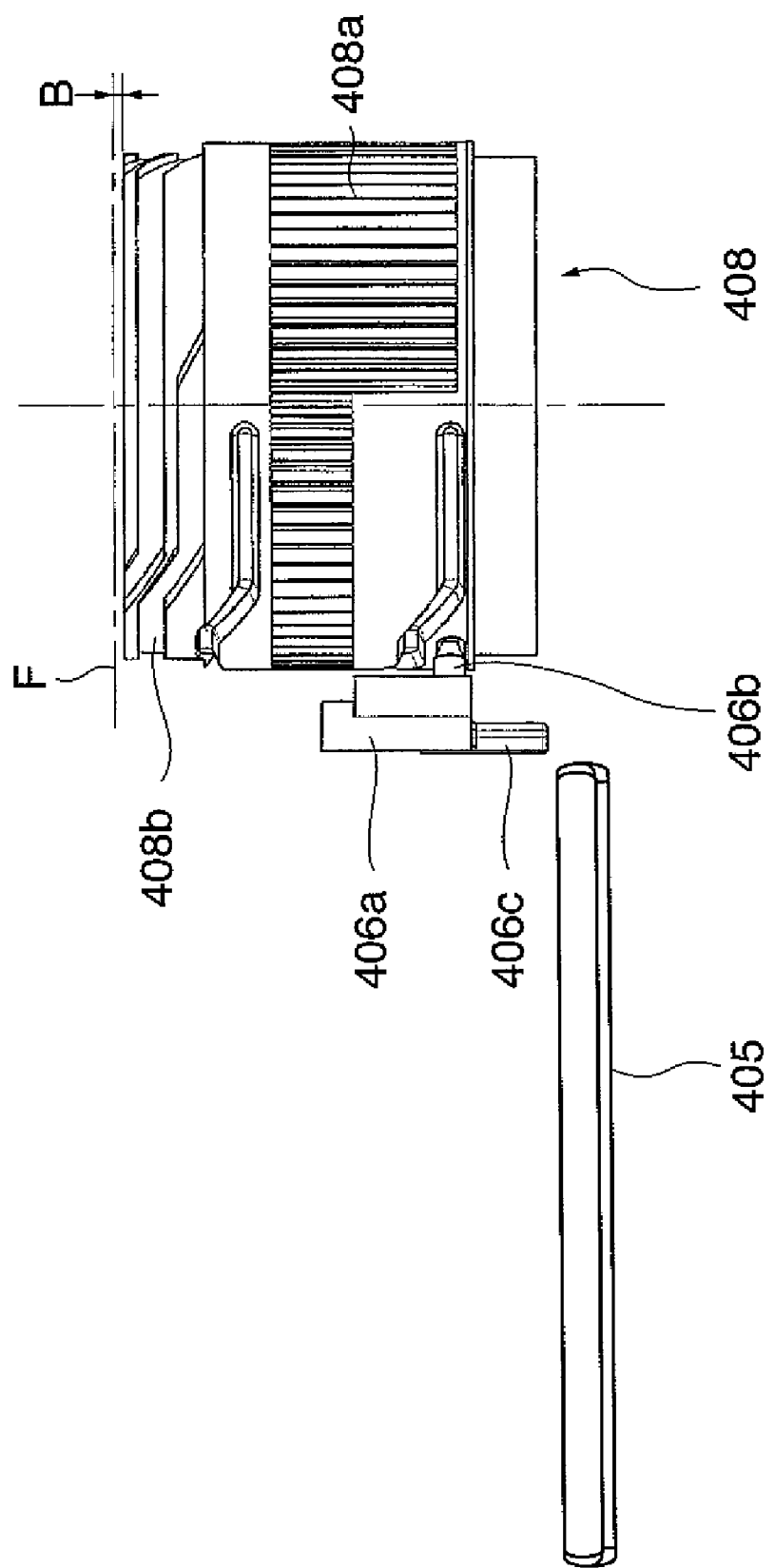
FIG. 30 is a top view of the main part of the digital camera, showing a constructional relationship between the barrier and drive ring when the barrier is in a state shown in FIG. 26.
Figure 31:
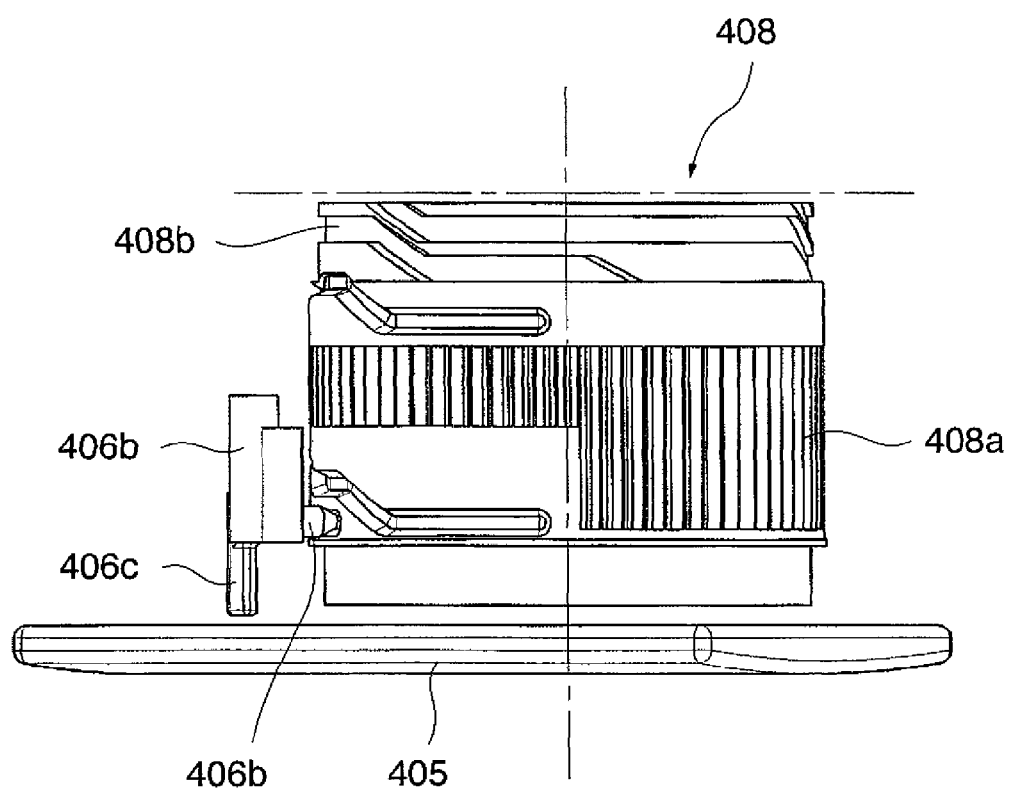
FIG. 31 is a top view of the main part of the digital camera, showing a constructional relationship between the barrier and drive ring when the barrier is in a state shown in FIG. 27.

Next, in a digital camera which has the above-mentioned locking mechanism of a sliding type barrier, a relationship between the movement of the drive ring 312 and the barrier 405 will be described with reference to FIGS. 29 to 31. Moreover, FIG. 29 is a top view of a main part of the digital camera, showing a constructional relationship between the barrier and the drive ring when the barrier is in a state shown in FIG. 25, and FIG. 30 is a top view of the main part of the digital camera, showing a constructional relationship between the barrier and the drive ring when the barrier is in a state shown in FIG. 26. Furthermore, FIG. 31 is a top view of the main part of the digital camera, showing a constructional relationship between the barrier and the drive ring when the barrier is in a state shown in FIG. 27.

When the drive ring 408 rotates from the shooting (e.g., wide-angle) state in FIG. 29 to the lens barrel retracted (e.g., collapsed) state by a zoom motor, a portion of the bayonet keyway 408b into which the bayonet key of the CCD holder is fitted shifts from the collapsing region 408b1 through the transition region 408b2 to the shooting region 408b3. Then, according to a lift of the transition region 408b2 in the optical axis direction, the drive ring 408 itself is retracted into the camera body by a difference (A–B) between a distance A from an optical axis direction-wise reference position F shown in FIG. 29, and a distance B from and optical axis direction-wise reference position F in FIG. 30.

In the lens barrel shooting state shown in FIG. 29, the lock portion 406c is in a locked state in which it projects from the opening portion 401a of the camera body. Thereafter, when the drive ring 408 retracts from the shooting state, shown in FIG. 29 to the lens barrel retracted state shown in FIGS. 30 and 31 by the distance (A–B), the cam pin 406b fitted into the barrier cam groove 408c moves by the distance (A–B).

Consequently, the lock portion 406c is released from the above-mentioned locked state, and then is retracted in the camera body as shown in FIG. 26. When the lock portion 406c is retracted in the camera body, movement of the barrier 405 is never disturbed, which enables the barrier 405 to be in a closed state as shown in FIGS. 27 and 31.

This embodiment is so constructed to perform a locking operation, related to opening and closing of the barrier, in conjunction with a lens barrel. In such a construction, it is possible to allow the shooting lens to have a larger total length even in a case where the collapsed lens barrel length is short. That is, in the lens barrel with the construction of the drive ring telescoping in the optical axis direction like the above-mentioned first embodiment, the drive ring 408 has the cam groove 408c for locking the barrier into which the cam pin 406b in a side of the barrier lock lever 406 is fitted. Therefore, rotation of the drive ring 408 provides a greater telescoping amount of the shooting lens than even before, and realizes a locking mechanism of the barrier 405 for protecting the lens barrel.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-208958 filed Jul. 19, 2005, which is hereby incorporated by reference herein in its entirety.

What is claimed is:

1. A lens barrel comprising:
a shooting lens disposed movably in an optical axis direction of said lens barrel; and
a lens driving member which moves said shooting lens in the optical axis direction while said lens driving member is rotating around the optical axis,
wherein said lens driving member has a first cam portion and a second cam portion, said first cam portion is configured to move said lens driving member in the optical axis direction in a transition region between a shooting region and a non-shooting region while said lens driving member is rotating around the optical axis, said second cam portion is configured to move an external member outside said lens barrel relative to said lens driving member in the optical axis direction while the lens driving member is rotating around the optical axis, and
wherein said second cam portion moves the external member in the optical axis direction in the shooting region, and said second cam portion is formed in the transition region so as to prevent the external member from moving in cooperation with the lens driving member in the transition region.

2. A lens barrel according to claim 1, wherein said external member is for driving an external finder lens.

3. A lens barrel according to claim 1, wherein said second cam portion is configured to move the external member in a transition region between the shooting region and the non-shooting region, and the second cam portion in the transition region is parallel the first cam portion in the transition region.

4. A lens barrel comprising:
a lens group disposed movably in an optical axis direction of said lens barrel; and
a drive ring disposed movable in the optical axis direction and which moves said lens group in the optical axis direction during which receiving a driving force from a driving unit to thereby rotate,
wherein said drive ring comprises a first groove that is formed on an outer surface of said drive ring and that moves a lens barrel-external member in the optical axis direction while said driving ring is rotating around the optical axis, and a second groove that is formed on the outer surface of said drive ring and that moves said drive ring in the optical axis direction toward an object in a transition region between a shooting region and a non-shooting region while said driving ring is rotating around the optical axis, and
wherein said first groove is adapted to move said lens barrel-external member in the optical axis direction in the shooting region, and said second groove is formed in the transition region so as to prevent said lens barrel-external member from moving in the optical axis direction toward the object when said drive ring moves in the optical axis direction toward the object.

5. A lens barrel according to claim 4, wherein said lens barrel-external member is an external finder lens.

6. A lens barrel according to claim 4, wherein said lens barrel-extender member is an external strobe.

7. An apparatus comprising:
an image sensing device; and
a lens barrel that directs scene light to the image sensing device;
wherein the lens barrel includes a shooting lens disposed movably in an optical axis direction of said lens barrel, and a lens driving member which moves said shooting lens in the optical axis direction while said lens driving member is rotating around the optical axis,
wherein said lens driving member has a first cam portion and a second cam portion, said first cam portion is configured to move said lens driving member in the optical axis direction in a transition region between a shooting region and a non-shooting region while said lens driving member is rotating around the optical axis, said second cam portion is configured to move an external member outside said lens barrel relative to the lens driving member in the optical axis direction while said driving member is rotating around the optical axis, and
wherein said second cam portion moves said external member in the optical axis direction in the shooting region, and said second cam portion is formed in the transition region so as to prevent the external member from moving with the lens driving member in the transition region.

8. An apparatus according to claim 7, wherein the external member is for driving an external finder lens.

9. An apparatus according to claim 7, wherein said second cam portion is configured to move the external member in a transition region between the shooting region and the non-shooting region, and the second cam portion in the transition region is parallel the first cam portion in the transition region.

10. A method of moving a lens barrel that includes a shooting lens disposed movably in an optical axis direction of said lens barrel, and a lens driving member which moves said shooting lens in the optical axis direction while said lens driving member is rotating around the optical axis wherein said lens driving member has a first cam portion and a second cam portion, said method comprising:
moving said driving member in the optical axis direction in a transition region between a shooting region and a non-shooting region while said driving member is rotating around the optical axis with said first cam portion; and
moving an external member outside said lens barrel relative to the lens driving member in the optical direction while said driving member is rotating around the optical axis with said second cam portion,
wherein said second cam portion moves said external member in the optical axis direction in the shooting region, and said second cam portion is formed in the transition region so as to prevent the external member from moving with the lens driving member in the transition region.

* * * * *